US010183723B2

(12) United States Patent
Swanson et al.

(10) Patent No.: US 10,183,723 B2
(45) Date of Patent: Jan. 22, 2019

(54) BICYCLE CONTROL DEVICE

(71) Applicant: SRAM, LLC, Chicago, IL (US)

(72) Inventors: Neil Swanson, Colorado Springs, CO (US); Mark Santurbane, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 245 days.

(21) Appl. No.: 14/656,297

(22) Filed: Mar. 12, 2015

(65) Prior Publication Data

US 2016/0264213 A1   Sep. 15, 2016

(51) Int. Cl.
*B62L 3/02* (2006.01)
*B62M 25/08* (2006.01)
*B62K 23/06* (2006.01)
*B62M 25/04* (2006.01)

(52) U.S. Cl.
CPC .............. *B62L 3/023* (2013.01); *B62K 23/06* (2013.01); *B62M 25/08* (2013.01); *B62M 25/04* (2013.01)

(58) Field of Classification Search
CPC . B62K 23/06; B62L 3/023; B62L 1/12; B62L 1/14; B62L 1/16; B62L 3/02; B60L 1/00; B60T 11/22; B60T 11/232; B60T 11/18; B60T 11/165; B60T 11/16; B60T 11/224; B60T 11/236; B60T 7/102; B62M 9/122; B62M 9/121
USPC ......................................... 184/344, 26, 73.31
See application file for complete search history.

(56) References Cited

U.S. PATENT DOCUMENTS

| 3,935,930 A * | 2/1976 | Kine ....................... B62L 3/023 188/344 |
| 5,636,518 A * | 6/1997 | Burgoyne .............. B62K 23/02 60/594 |
| 5,950,772 A * | 9/1999 | Buckley ................. B62K 23/06 188/18 A |
| 6,003,639 A | 12/1999 | Buckley et al. |
| 7,963,114 B2 | 6/2011 | Moore |
| 8,046,996 B2 | 11/2011 | Dunlap |
| 8,464,844 B2 | 6/2013 | Jordan |
| 2003/0121262 A1 | 7/2003 | Lumpkin |
| 2003/0121736 A1* | 7/2003 | Lumpkin ................ B60T 7/102 188/151 R |
| 2004/0045775 A1* | 3/2004 | Lavezzi .................. B60T 11/16 188/24.11 |

(Continued)

FOREIGN PATENT DOCUMENTS

| CN | 103204219 | 7/2013 |
| DE | 102013021425 A1 | 6/2014 |

(Continued)

OTHER PUBLICATIONS

Formula Products 2014 Catalog, pp. 2-5.

Primary Examiner — Robert A. Siconolfi
Assistant Examiner — San M Aung

(57) ABSTRACT

A bicycle control device for use with a road bicycle includes a hydraulic brake control device and a shift control device. The brake and shift control devices are disposed within a housing. The brake control device includes a master cylinder arranged in the housing. A piston assembly includes a piston slidably disposed within the master cylinder. A brake lever is operatively coupled to the piston such that the brake lever pulls the piston from a rest position to an actuated position.

55 Claims, 18 Drawing Sheets

(56) References Cited

U.S. PATENT DOCUMENTS

| | | | |
|---|---|---|---|
| 2004/0163897 A1* | 8/2004 | Becocci | B60T 11/046 188/24.22 |
| 2007/0215417 A1* | 9/2007 | Chen | B62L 3/023 188/24.22 |
| 2009/0120751 A1* | 5/2009 | Lin | B60T 7/10 188/344 |
| 2009/0208330 A1 | 8/2009 | Addis | |
| 2010/0043426 A1* | 2/2010 | Moore | B60T 11/16 60/594 |
| 2012/0145497 A1* | 6/2012 | Wang | B60T 7/102 188/344 |
| 2012/0160625 A1* | 6/2012 | Jordan | B60T 7/102 188/344 |
| 2013/0180815 A1 | 7/2013 | Dunlap et al. | |
| 2013/0277162 A1* | 10/2013 | Nago | B62K 23/06 188/344 |
| 2014/0060987 A1 | 3/2014 | Miles | |
| 2014/0174237 A1 | 6/2014 | Watarai et al. | |
| 2014/0174243 A1 | 6/2014 | Watarai et al. | |
| 2014/0177866 A1 | 6/2014 | Matsushita | |
| 2014/0231202 A1* | 8/2014 | Shih | B62L 3/023 188/344 |

FOREIGN PATENT DOCUMENTS

| | | |
|---|---|---|
| EP | 0640051 | 3/1995 |
| EP | 2615020 A2 | 7/2013 |

\* cited by examiner

BICYCLE CONTROL DEVICE

BACKGROUND OF THE INVENTION

The present disclosure relates generally to a bicycle control device and, more particularly, to a bicycle control device having a hydraulic brake control device.

SUMMARY

According to one aspect, a bicycle control device for use with a road bicycle includes a hydraulic brake control device and a shift control device. The brake and shift control devices are disposed in a housing. The hydraulic brake control device includes a master cylinder arranged in the housing. A piston assembly includes a piston slidably disposed within the master cylinder. A brake lever is operatively coupled to the piston such that the brake lever pulls the piston assembly from a rest position to an actuated position.

According to another aspect, a bicycle control device for use with a road bicycle includes a housing having a handlebar mounting portion at a first end, a horn portion at a second end and a gripping portion disposed between the handlebar mounting portion and the horn portion. A master cylinder is arranged in the housing. A piston assembly includes a piston slidably disposed within the master cylinder. An actuator is operatively coupled to the piston to slidably displace the piston between a rest position and an actuated position. An adjuster operatively coupled to the master cylinder to adjust the master cylinder relative to the piston assembly.

In yet another aspect, a bicycle control device for use with a road bicycle includes a housing having handlebar mounting portion at a first end, a horn portion at a second end, and a gripping portion disposed between the handlebar mounting portion and the horn portion. The housing including a master cylinder aperture and a hydraulic fluid reservoir. A master cylinder sleeve is disposed in the master cylinder aperture and defines a master cylinder bore. A piston assembly includes a piston slidably disposed within the master cylinder bore. An actuator is operatively coupled to the piston to slidably displace the piston between a rest position and an actuated position.

In still another aspect, a master cylinder sleeve is received in a bicycle brake housing and movable between a first deadband position and a second deadband position. The master cylinder sleeve includes a sealing member configured to seal against the bicycle brake housing. The master cylinder sleeve also includes a master cylinder bore arranged interior of the sealing member, defining an axis, and configured to receive a piston for movement within the master cylinder bore along the axis. Further, the master cylinder sleeve includes a timing port arranged interior of the sealing member and providing fluid communication to the master cylinder bore in a timing plane perpendicular to the axis.

BRIEF DESCRIPTION OF DRAWINGS

Other aspects and advantages of the embodiments disclosed herein will become apparent upon consideration of the following detailed description, wherein similar or identical structures have similar reference numerals.

DETAILED DESCRIPTION

Figure 1:
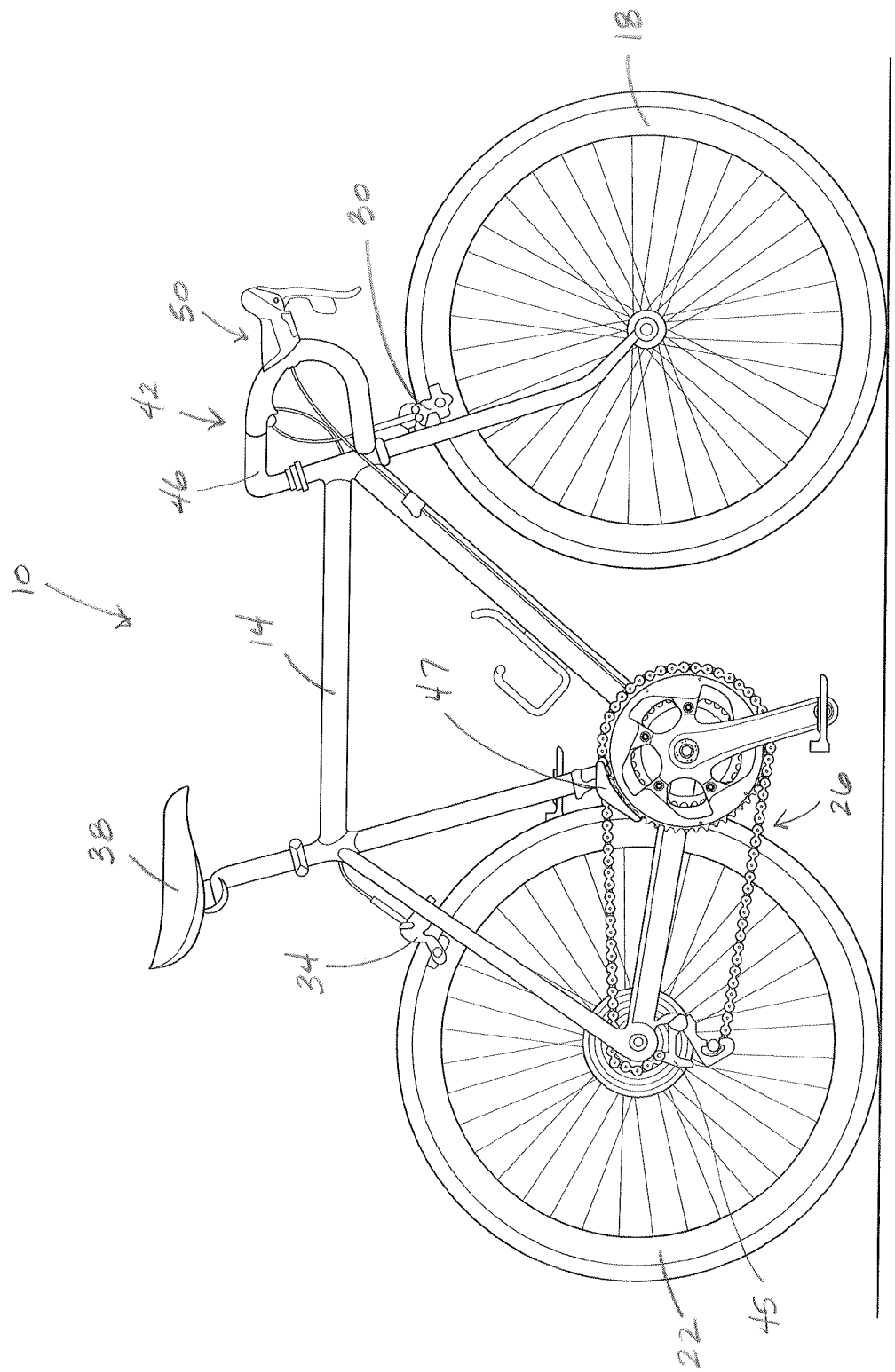
FIG. 1 is a right side elevational view of a road bicycle according to one embodiment of the invention.

With reference to the disclosure herein, a bicycle control device for a road bicycle is described. One exemplary handlebar-steered road bicycle 10 is depicted in FIG. 1. However, the present disclosure is practicable with other bicycles and other handlebar-steerable vehicles, as desired. The bicycle 10 generally includes a frame 14 supported on a front wheel 18 and a rear wheel 22. A drivetrain 26 is arranged to provide power to the rear wheel 22 and a front brake 30 and a rear brake 34 are arranged to slow rotation of the front wheel 18 and the rear wheel 22, respectively. A saddle 38 is provided for use by a rider. Further, a handlebar assembly 42 is arranged to control the direction of the front wheel 18 and communicate with the drive train 26, the front brake 30, and the rear brake 34 to control operation thereof.

It is to be understood that the specific arrangement and illustrated components of the frame 14, front wheel 18, rear wheel 22, drivetrain 26, front brake 30, rear brake 34, and saddle 38 are nonlimiting to the disclosed embodiments. For example, while the front brake 30 and the rear brake 34 are illustrated as hydraulic rim brakes, hydraulic disc brakes are contemplated and encompassed within the scope of the disclosure.

The handlebar assembly 42 includes a handlebar 46, a right bicycle control device 50, and a left bicycle control device (not shown). Typically, the right bicycle control device 50 controls operation of a rear derailleur 45 (part of the drivetrain 26) and the rear brake 34 while the left bicycle control device controls a front derailleur 47 (part of the drivetrain 26) and the front brake 30. The illustrated handlebar 46 is a drop-style handlebar. In other embodiments, different handlebar styles may be employed (e.g., bullhorn, flat, riser, etc.), as desired.

Figure 2:
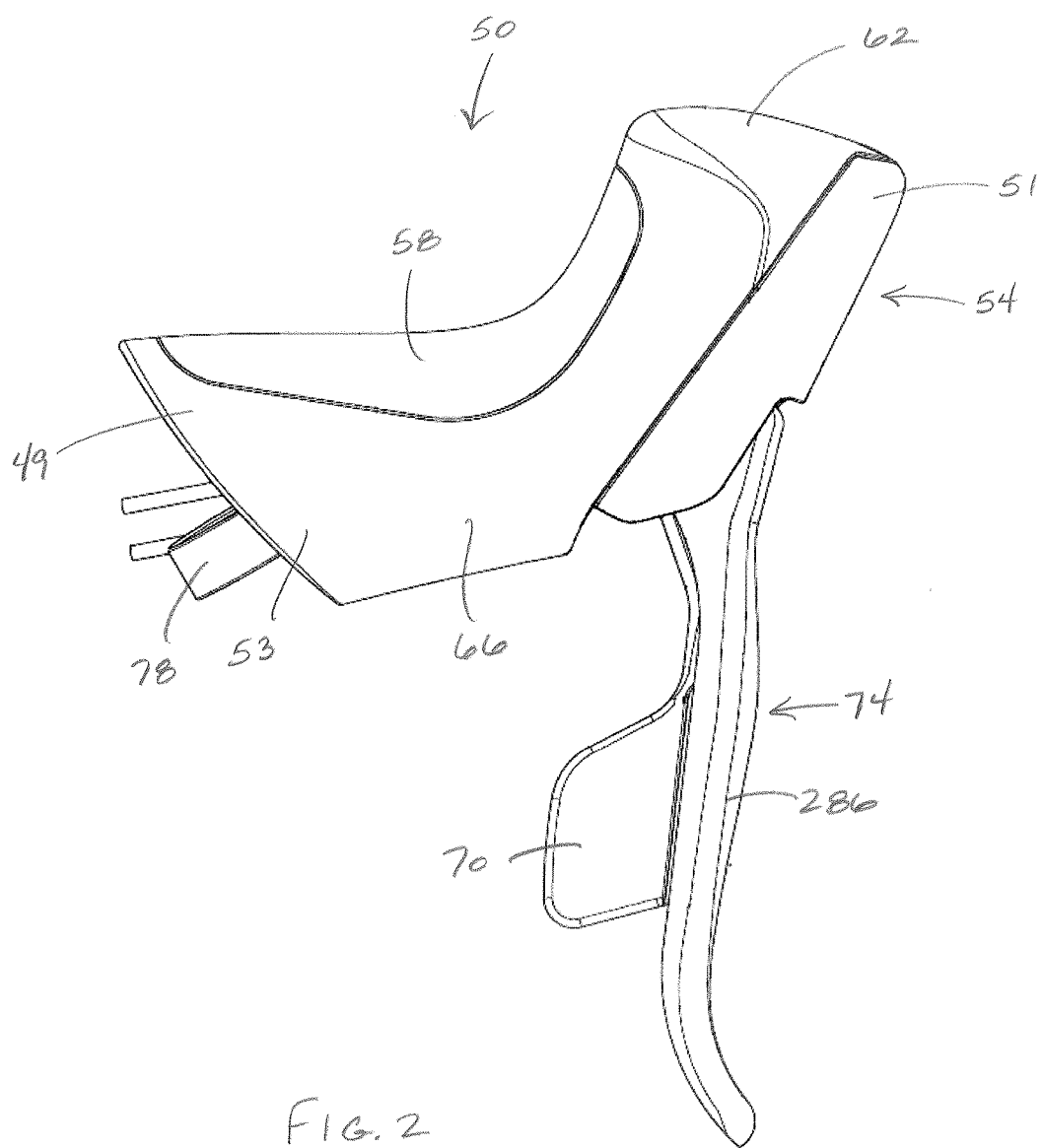
FIG. 2 is a right side perspective view of a bicycle control device of the bicycle of FIG. 1.

FIG. 2 shows the right bicycle control device 50 detached from the handlebar 46. The right bicycle control device 50 includes a housing 54, a shift control device 55 (see FIG. 7), and a hydraulic brake control device 56 (see FIG. 6). The housing 54 has first and second ends 49, 51. The housing 54 includes a handlebar mounting portion 53 at the first end 49, a horn portion 62 at the second end 51 and a gripping portion 58 arranged between the handlebar mounting portion 53 and the horn portion 62. The handlebar mounting portion 53 supports a clamp 78 used to fasten the right bicycle control device 50 to the handlebar 46.

A grip cover 66 is stretched over at least the gripping portion 58 and the horn portion 62 to provide a cushion or an ergonomical gripping surface for a user. Typically, the grip cover 66 is made of an elastic material such as rubber. The grip cover 66 is removable from the housing 54 to provide access to internal components of the right bicycle control device 50. A shift lever 70 and a brake lever 74 are coupled to the housing 54, and interact with the shift control device 55 and the brake control device 56, respectively.

Figure 3:
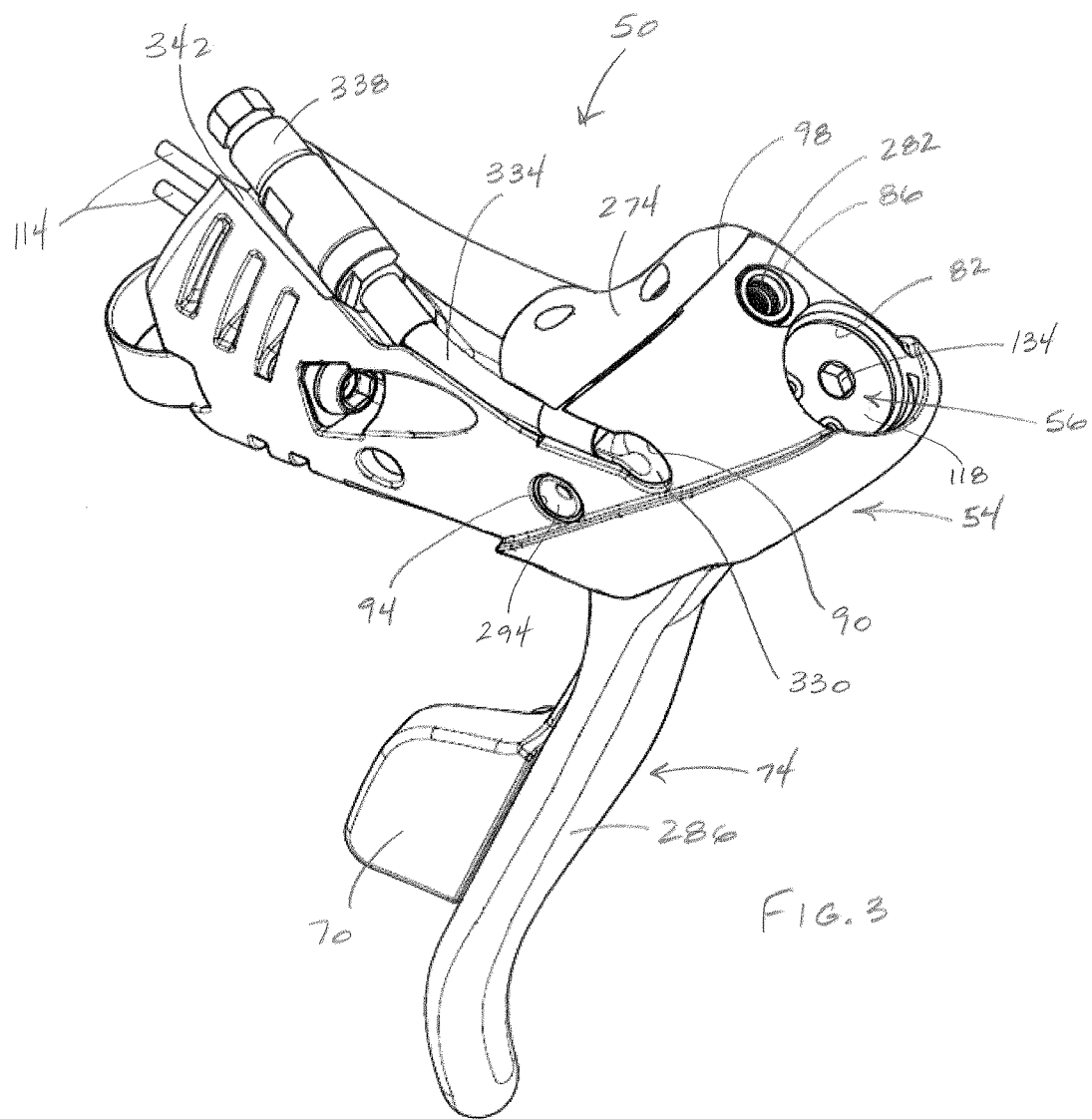
FIG. 3 is a top right perspective view of the bicycle control device of FIG. 2 with a grip cover removed.
Figure 4:
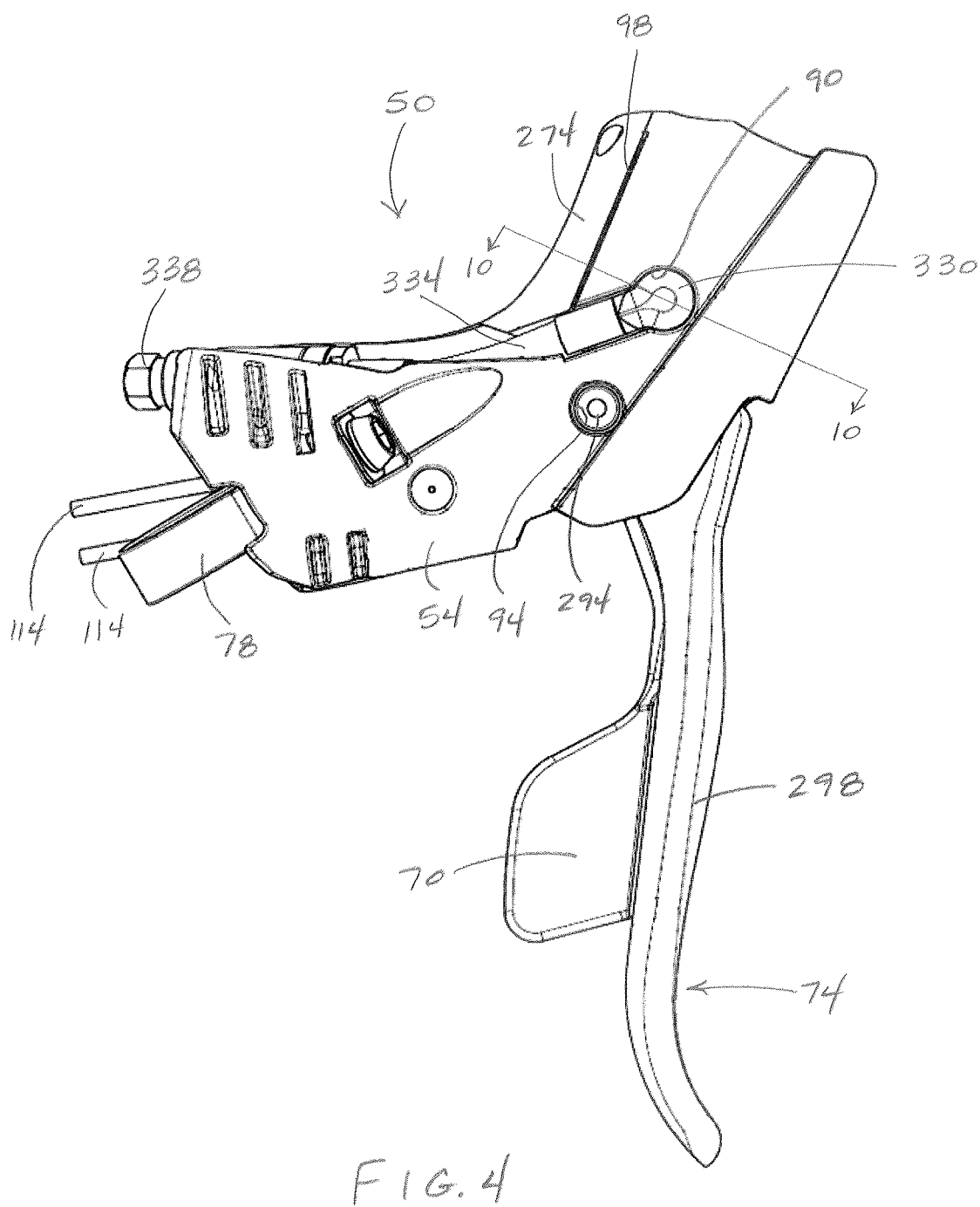
FIG. 4 is right side elevational view of the right bicycle control device of FIG. 3.
Figure 5:
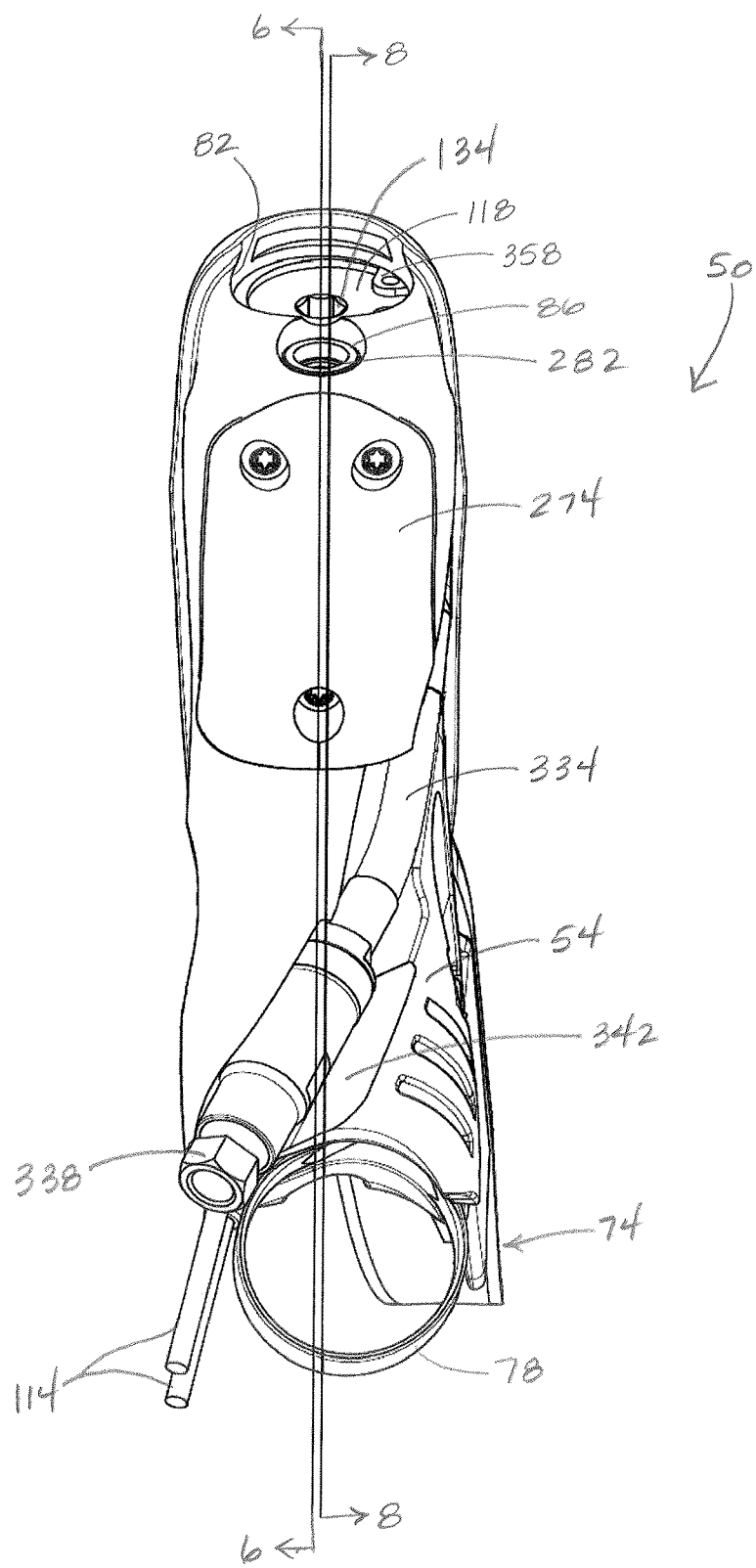
FIG. 5 is a rear elevational view of the right bicycle control device of FIG. 3.

Turning to FIG. 3, the right bicycle control device 50 is shown with the grip cover 66 removed. The housing 54 defines a threaded master cylinder aperture 82, a reservoir aperture 86, a banjo aperture 90, a lever pin aperture 94, a diaphragm aperture 98, and a shift control device aperture 102 (see FIG. 7).

Figure 6:
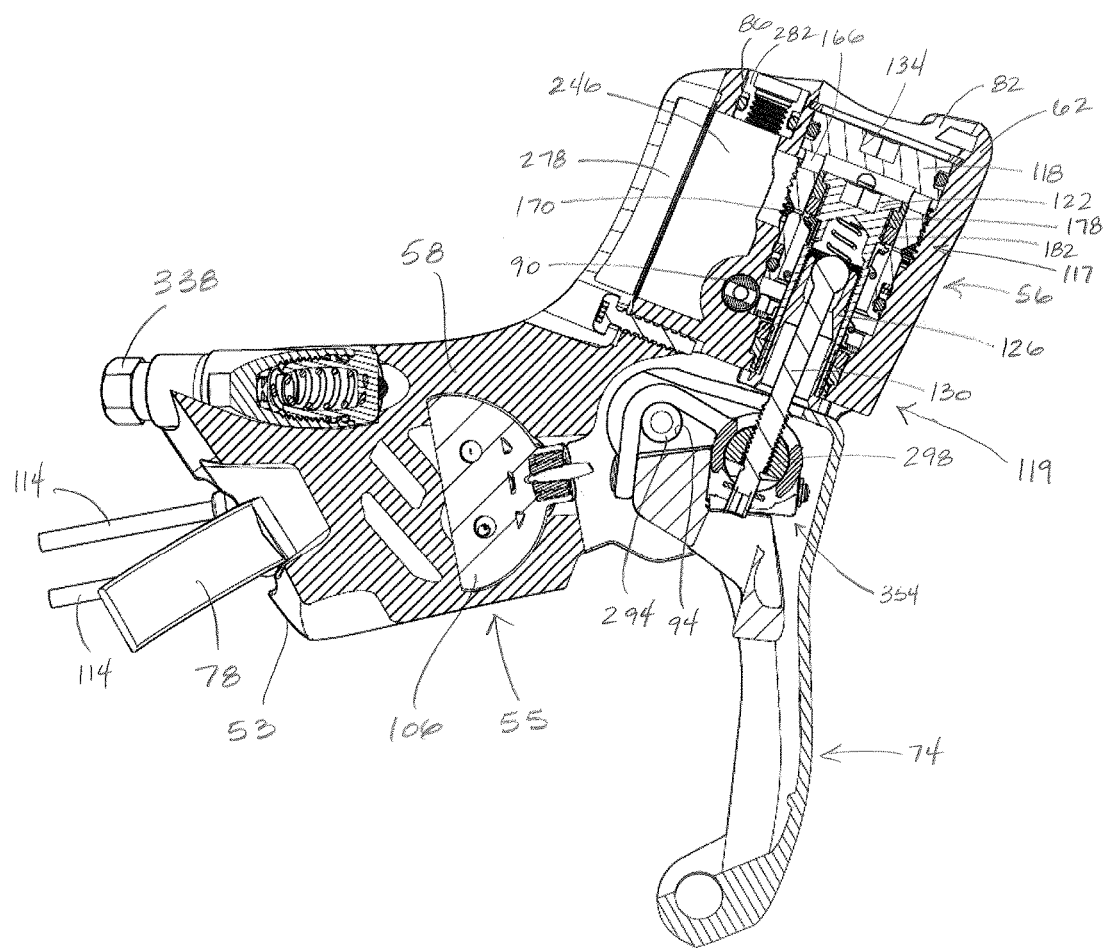
FIG. 6 is a sectional view of the right bicycle control device of FIG. 3 taken along the line 6-6 of FIG. 5.
Figure 8:
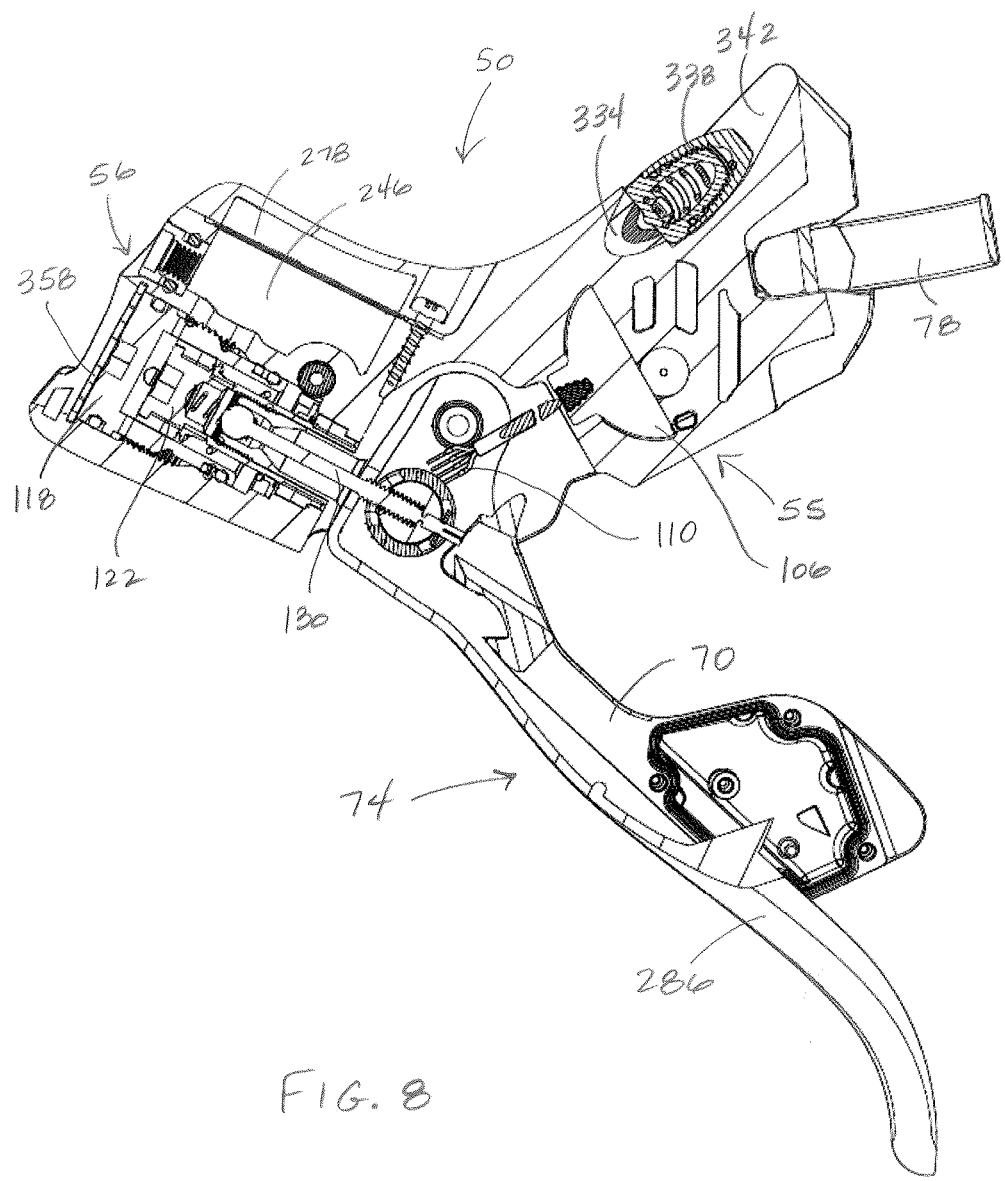
FIG. 8 is a sectional view of the right bicycle control device of FIG. 3 taken along the line 8-8 of FIG. 5.
Figure 9:
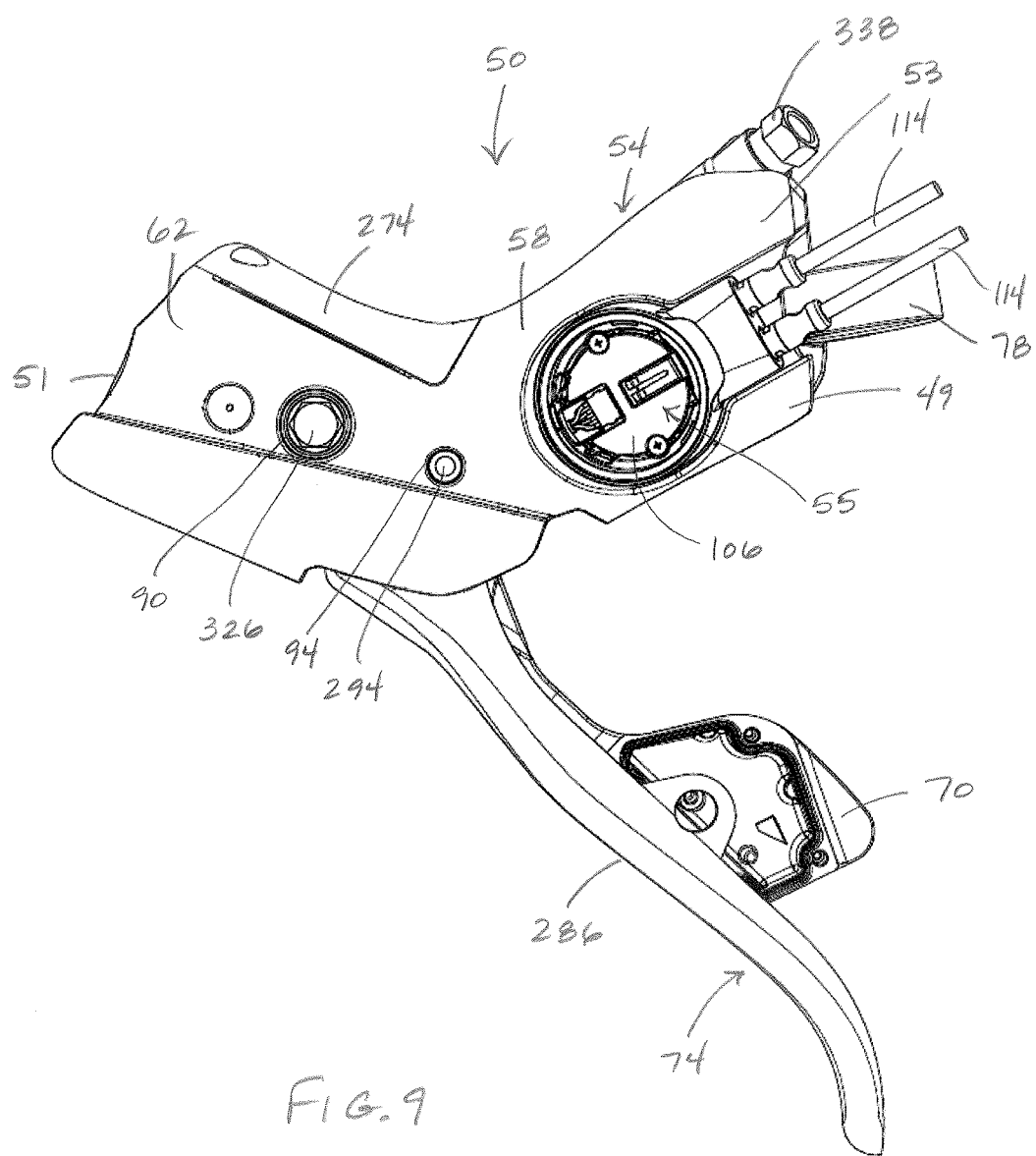
FIG. 9 is a left side elevational view of the right bicycle control device of FIG. 3.

With reference to FIGS. 6 and 9, the illustrated shift control device 55 includes an electronic shift module 106, a shift sensor 110 (see FIG. 8), and communication wires 114. The shift sensor 110 is arranged to detect motion of the shift lever 70 and sends a signal to the electronic shift module 106. The electronic shift module 106 interprets the signal, and communicates with the rear derailleur 45 of the drivetrain 26. In another embodiment, the shift control device 55 may be a mechanical shift control device, as desired, and the housing could be adjusted to accommodate the mechanical structures of a mechanical shift control device. In another embodiment, the shift control device 55 may be eliminated such that the invention is practiced without a shift control device of any kind.

Figure 7:
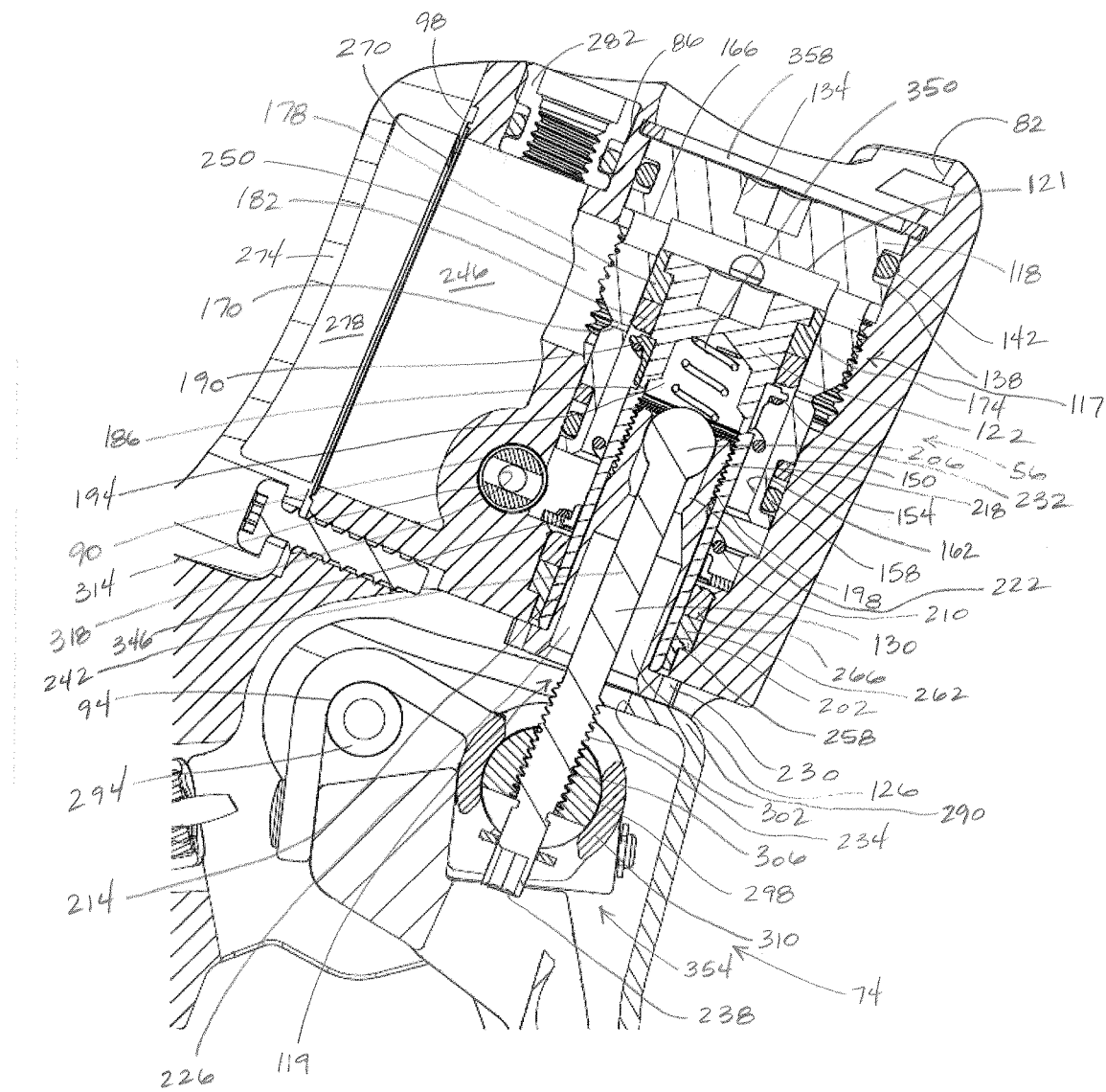
FIG. 7 is an enlarged view of portion of the bicycle control device of FIG. 6.

The hydraulic brake control device 56 will be discussed below with specific reference to FIG. 7. The brake control device 56 includes a master cylinder, in this embodiment a master cylinder sleeve 118 that is received within the master cylinder aperture 82, a piston assembly 119, and an adjuster 117 for adjusting the master cylinder sleeve 118 relative to the piston assembly 119. The piston assembly 119 includes a piston 121 and a piston rod 130. The piston 121 includes a piston cap 122 received by the master cylinder sleeve 118 and a piston body 126 coupled to the piston cap 122.

Turning to FIGS. 11-14, the adjuster 117 includes threads 146 on the master cylinder sleeve 118 sized to threadingly engage surfaces defining the master cylinder aperture 82 of the housing 54. In other embodiments, the adjuster 117 may be any feature or device that allows the master cylinder sleeve 118 to be adjusted relative to the piston assembly 119. The master cylinder sleeve 118 includes a hex key recess 134 arranged to receive a hex key (not shown), a first sleeve recess 138 sized to receive a seal in the form of a first sleeve O-ring 142, a second sleeve recess 150 sized to receive a seal in the form of a sleeve cup seal 154 and a second sleeve O-ring 158, a sleeve bore 162, four compensation ports 166 in communication with the sleeve bore 162, and four timing ports 170 in communication with the sleeve bore 162. In other embodiments, the seals may be arranged differently or utilize different types of seals, as desired. Additionally, more than four or less than four compensation ports 166 may be utilized, and/or more than four or less than four timing ports 170 may be utilized, as desired. For example, up to nine timing ports 170 may be advantageous.

Figure 12:
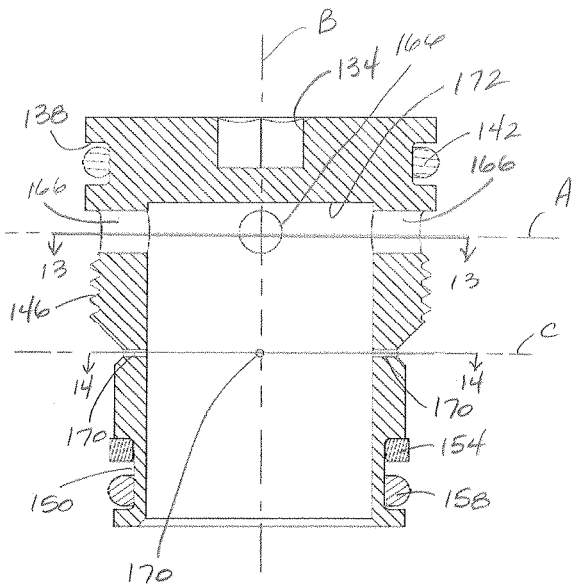
FIG. 12 is a sectional view of the master cylinder sleeve of FIG. 11 taken along the line 12-12 of FIG. 9.
Figure 13:
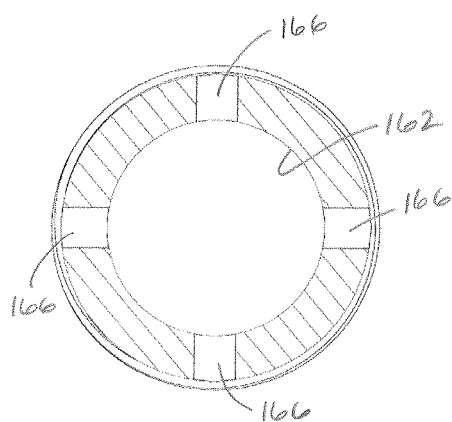
FIG. 13 is a sectional view of the master cylinder sleeve of FIG. 11 taken along the line 13-13 of FIG. 10.
Figure 14:
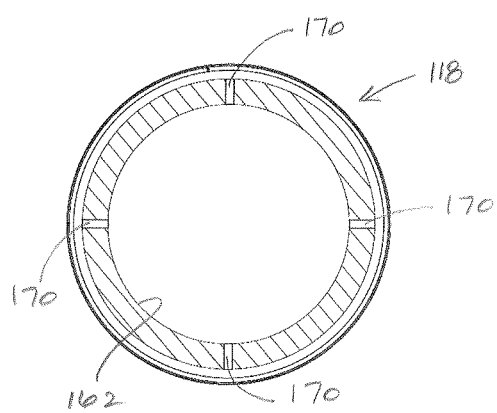
FIG. 14 is a sectional view of the master cylinder sleeve of FIG. 11 taken along the line 14-14 of FIG. 12.

With specific reference to FIG. 12, the compensation ports 166 are substantially aligned on a compensation plane A (aligned with section line 13-13) that is substantially perpendicular to a brake piston axis B and arranged interior of the first sleeve O-ring 142. The timing ports 170 are substantially aligned on a timing plane C (aligned with section line 14-14) that is substantially perpendicular to the brake piston axis B and arranged interior of both the first sleeve O-ring 142 and the compensation plane A. Both the compensation ports 166 and the timing ports 170 are positioned radially equidistantly about the brake piston axis B in aligned positions. In other embodiments, the spacing may be non-equidistant or the relative alignment of the compensation ports 166 and the timing ports 170 may be shifted, as desired.

The illustrated timing ports 170 each define a timing port diameter of about 0.40 mm and the four timing ports 170 together provide a total timing flow area of about 0.64 mm$^2$. In other embodiments, the timing port diameter could be between about 0.3 mm and 0.5 mm. In other embodiments, as the diameters of timing ports 170 change, the number of timing ports 170 may also change to maintain a consistent total timing flow area between about 0.55 mm$^2$ and about 0.65 mm$^2$.

Turning back to FIG. 7, the piston cap 122 includes a cap shoulder 174 sized to receive a first bushing 178 and a first cup seal 182, a cap recess 186 sized to receive a first return spring cap 190, an internal cap bore 194 with a cap bore threaded portion 198, and a piston cap outer surface 202.

The first bushing 178 is shaped to engage the shoulder 174 of the piston cap 122 and to slidingly engage the sleeve bore 162 of the master cylinder sleeve 118. The first cup seal 182 sealingly engages both the piston cap 122 and the sleeve bore 162 and is maintained in position by the first bushing 178 and the first return spring cap 190. The first return spring cap 190 is fixed in the cap recess 186, defines a spring shoulder 206 sized to engage a return spring 210, and aids in maintaining the first cup seal 182 in position.

The piston body 126 has a piston outer surface 214 sized to be received within the internal cap bore 194, a threaded portion 218 sized to engage the threaded portion 198 of the piston cap 122, a rod receiving feature in the form of a socket 222, a piston internal bore 226, and a piston base portion or flange 230 arranged to engage the brake lever 74 and the housing 54. The socket 222 defines a substantially open top area and a throat of reduced diameter.

The piston rod 130 includes a piston engaging portion in the form of a ball 232, a threaded portion 234, a hex key recess 238, and a shaft 242 extending between the threaded portion 234 and the ball 232.

Figure 10:
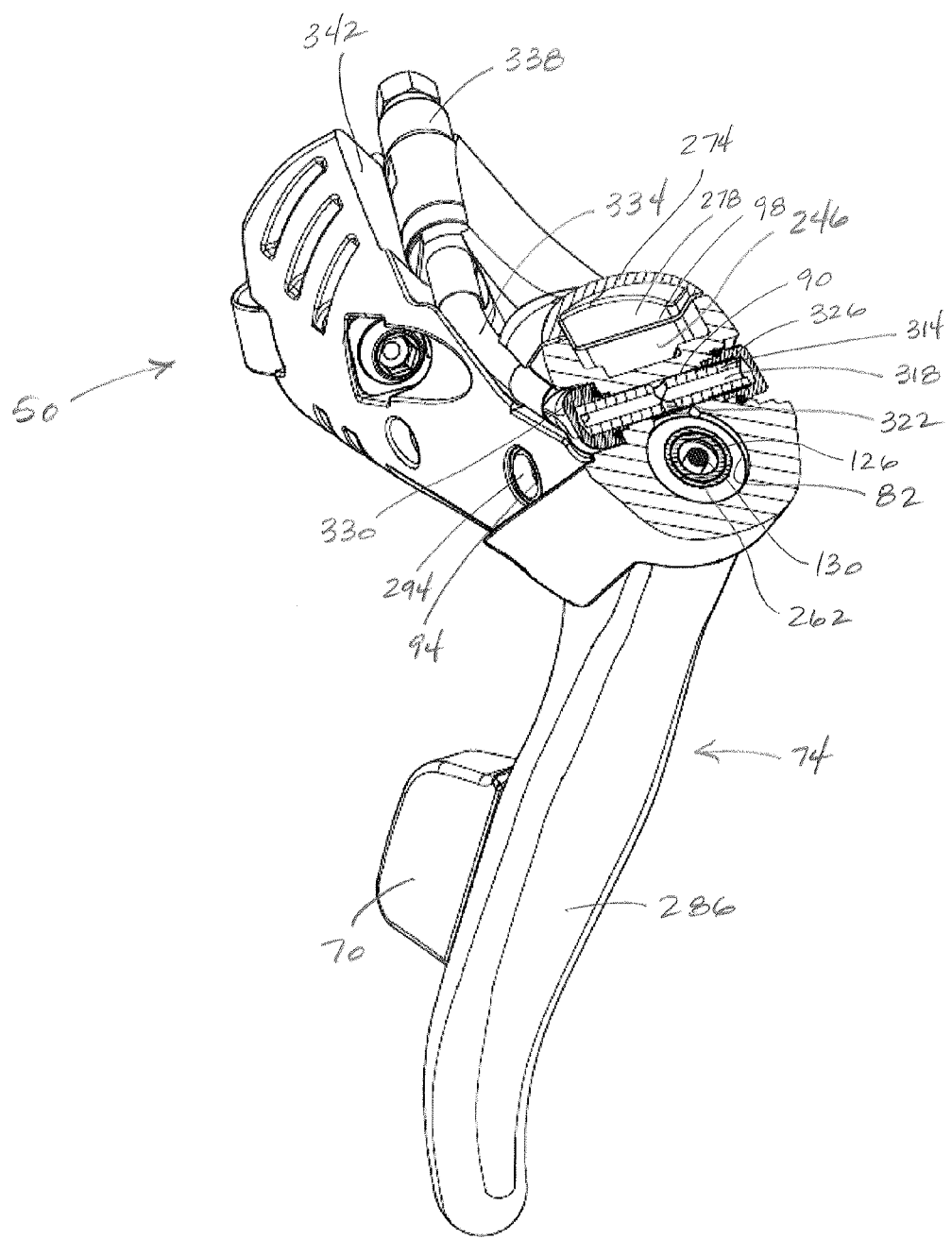
FIG. 10 is a sectional view of the right bicycle control device of FIG. 3 taken along the line 10-10 of FIG. 4.
Figure 11:
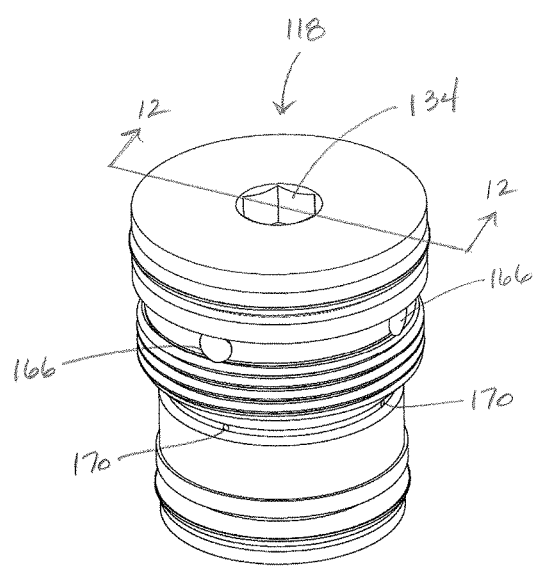
FIG. 11 is a top right perspective view of a master cylinder sleeve according to one embodiment of the invention.

Below will be described additional features of the housing 54 that interact with and contribute to the brake control device 56. As shown in FIG. 7, the diaphragm aperture 98 and the reservoir aperture 86 open into a reservoir 246. A reservoir aperture 250 provides communication between the reservoir 246 and the compensation and timing ports 166, 118 of the master cylinder sleeve 118. A housing shoulder 258 is arranged toward the brake lever 74 and sized to receive a second bushing 262 and a second cup seal 266. The second bushing 262 is sized to slidingly engage the piston cap outer surface 202. The second cup seal 266 is sized to provide a seal between the master cylinder aperture 82 and the piston cap outer surface 202. As shown in FIG. 10, the master cylinder aperture 82 and the banjo aperture 90 are connected and in fluid communication.

With reference again to FIG. 7, a flexible diaphragm 270 is disposed between surfaces defining the diaphragm aperture 98 and a reservoir cap 274 such that an air space 278 is separated from the reservoir 246. A reservoir plug 282 is threadingly engaged with surfaces defining the reservoir aperture 86 such that when the reservoir plug 282 is threaded into the reservoir aperture 86 the reservoir 246 is effectively sealed, and when the reservoir plug 282 is removed communication is provided to the reservoir 246. The reservoir cap 274 is fastened to the housing 54 with screws. In other embodiments, other fasteners may be used or the reservoir cap 274 may be attached in another way.

The brake lever 74 includes a hand engaging portion 286, a top wall 290, a pivot in the form of a pivot pin 294, and a brake engaging feature in the form of a captured ball 298. A lever aperture 302 is formed in the top wall 290 such that the piston rod 130 may pass therethrough. The pivot pin 294 is sized to be received in the lever pin aperture 94 such that the brake lever 74 is supported for rotation relative to the housing 54. The captured ball 298 defines a threaded reach aperture 306 sized to threadingly receive the threaded portion 234 of the piston rod 130. The captured ball 298 is supported by a bracket 310 formed in the brake lever 74.

Turning to FIG. 10, an outlet tube 314 is sized to be received in the banjo aperture 90 such that the outlet tube 314 is arranged substantially perpendicular to the brake piston axis B. The outlet tube 314 defines an outlet passageway 318 and an outlet tube aperture 322 providing fluid communication with the outlet passageway 318. The outlet tube 314 is arranged to receive an outlet plug 326 on one end and a banjo fitting 330 on the other end such that there is fluid communication between the master cylinder aperture 82, the outlet passageway 318, and the banjo fitting 330. A flexible tube 334 fluidly connects the banjo fitting 330 to a hydraulic fitting 338 arranged to couple to hydraulic tubing on the bicycle 10. The housing 54 defines a hydraulic tube recess 342 arranged to receive the banjo fitting 330, the flexible tube 334, and the hydraulic fitting 338 such that a smooth and ergonomic body portion 58 is presented to the user when the grip cover 66 is installed.

Assembly of the brake control device 56 will be discussed below with reference to FIGS. 6 and 7. First, the second bushing 262 is inserted into the master cylinder aperture 82 and abutted with the housing shoulder 258. The second cup seal 266 is slid in after and pressed against the second bushing 262. Then a second return spring cap 346 is inserted into the master cylinder aperture 82.

The return spring 210 is slid onto the piston cap outer surface 202 and the assembled piston cap 122 along with the return spring 210, the first bushing 178, the first cup seal 182, and the first return spring cap 190 are inserted into the master cylinder aperture 82 such that the piston cap outer surface 202 is received into the second cup seal 266 and the second bushing 262 and the return spring 210 is captured between the first return spring cap 190 and the second return spring cap 346 such that the return spring 210 biases the piston cap 122 toward a first position in the form of a rest position.

The piston rod 130 is then inserted into the socket 222 of the piston body 126 such that the ball 232 engages the socket 222. A rod spring 350 is then arranged on top of the ball 232 and the assembled piston body 126 and piston rod 130 with the rod spring 350 are inserted from a bottom side of the master cylinder aperture 82 into the internal cap bore 194. Further, the threaded portion 218 of the piston body 126 is engaged with the threaded portion 198 of the piston cap 122 until the base portion 230 of the piston body 126 abuts the end of piston cap 122. The rod spring 350 is captured between the piston cap 122 and the ball 232 and biases the piston rod 130 into the socket 222. The assembled piston cap 122, piston body 126, and piston rod 130 form the piston assembly which operates inside the master cylinder sleeve 118 to move hydraulic fluid and actuate the rear brake 34.

The threaded reach aperture 306 of the captured ball 298 is threaded onto the threaded portion 234 of the piston rod 130 to connect the brake lever 74 to the brake control device 56. The threaded portion 234 of the piston rod 130 and the captured ball 298 cooperate to provide a reach adjust mechanism 354.

The master cylinder sleeve 118 is then threaded into surfaces defining the master cylinder aperture 82 such that the first bushing 178 and the first cup seal 182 are engaged with the sleeve bore 162. The threads 146 of the master cylinder sleeve 118 engage the surfaces defining the threaded master cylinder aperture 82. The master cylinder sleeve 118 is threaded in until the timing ports 170 are substantially aligned with the reservoir aperture 250. Further, the master cylinder sleeve 118 is threaded until the compensation ports 166 are substantially aligned with the reservoir aperture 250 and the first sleeve O-ring 142, the sleeve cup seal 154, and the second sleeve O-ring 158 engage surfaces defining the master cylinder aperture 82. A snap ring 358 is then engaged with surfaces defining the master cylinder aperture 82 to limit the travel of the master cylinder sleeve 118 out of the master cylinder aperture 82. The master cylinder sleeve 118 may be threaded farther into the master cylinder aperture 82 to adjust the position of master cylinder sleeve 118 relative to the piston assembly (as discussed further below).

Subsequent to the insertion of the master cylinder sleeve 118 into the master cylinder aperture 82, the outlet tube 314 is then inserted into the banjo aperture 90 with the outlet tube aperture 322 aligned with the master cylinder aperture 82. The outlet plug 326 and the banjo fitting 330 are coupled to the outlet tube 314. Further, the hydraulic fitting is snapped into the hydraulic tube recess 342 of the housing 54.

The diaphragm 270 is then placed in the diaphragm aperture 98 and the reservoir cap 274 fastened in place. The reservoir 246 may then be filled with hydraulic fluid, the rear brake 34 bled, and the reservoir plug 282 installed to seal the brake control device 56.

Figure 15:
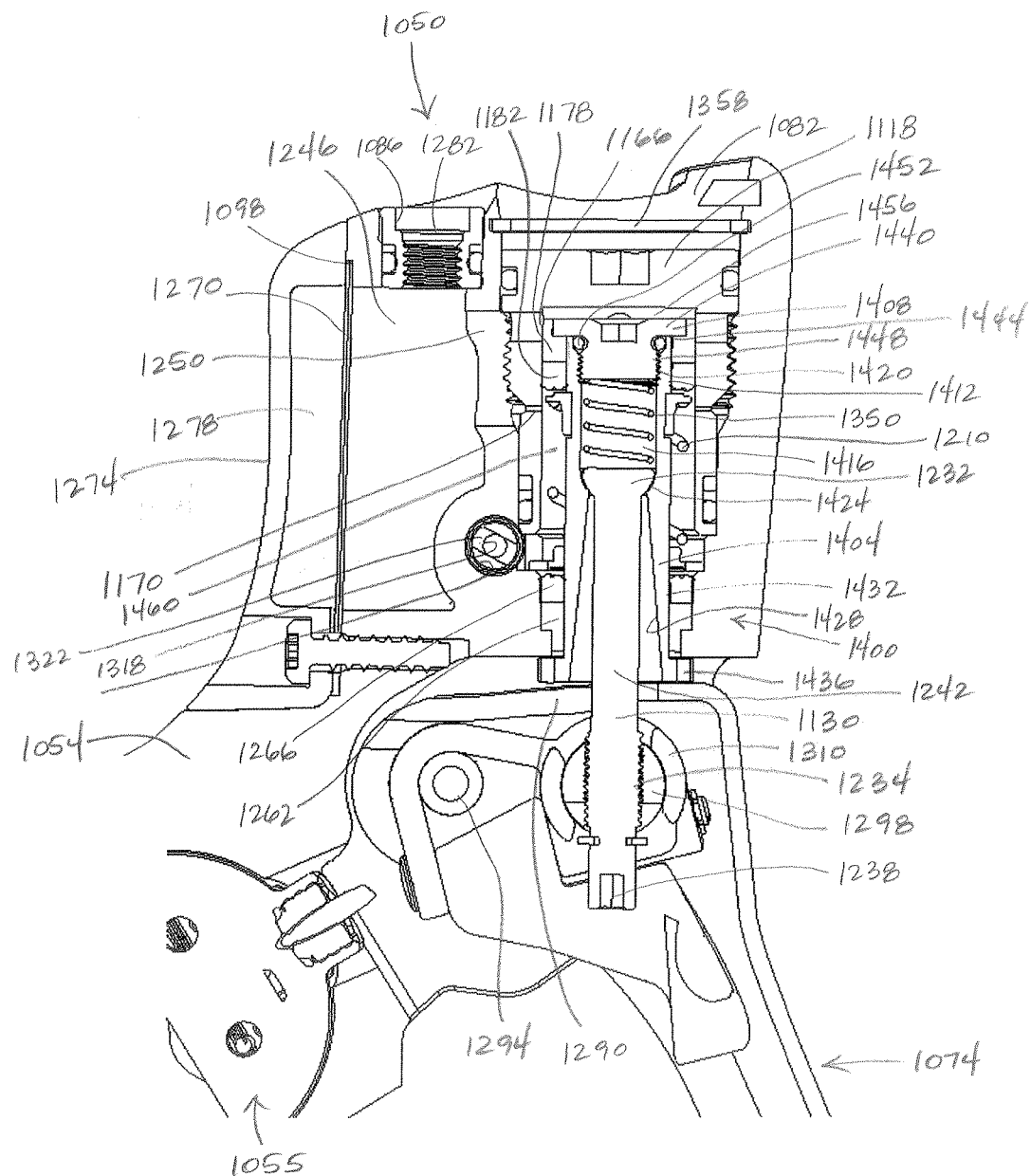
FIG. 15 is a sectional view of another bicycle control device according to a different embodiment positioned in a rest position.

FIG. 15 shows a right bicycle control device 1050 that is similar to the right bicycle control device 50 shown in FIGS. 1-14. Like components of the right bicycle control device 1050 are labeled in the 1000 series. The piston cap 122, the piston body 126, and the piston rod 130 are replaced in the right bicycle control device 1050 as described below.

A piston assembly 1400 includes a piston body 1404, a piston cap 1408, and a piston rod 1130. The piston body 1404 includes a first seal recess 1412, a piston internal bore 1416 with an upper threaded portion 1420, a socket 1424, a shaped rod clearance interior 1428, a piston outer surface 1432, and a base flange 1436.

The piston cap 1408 includes a cap flange 1440, a cap seal surface 1444, and a threaded portion 1448 sized to engage the upper threaded portion 1420 of the piston body 1404. The piston rod 1130 includes a piston engaging portion in the form of a ball 1232, a threaded portion 1234, a hex key recess 1238, and a shaft 1242 extending between the threaded portion 1234 and the ball 1232.

During assembly, the piston rod 1130 is inserted into the piston internal bore 1416 and the ball 1232 engaged with the socket 1424. The piston body 1404 and the piston rod 1130 are inserted into the master cylinder aperture 1082 from a bottom side. An O-ring 1452 is then installed onto the piston cap 1408 and arranged on the cap seal surface 1444. The threaded portion 1448 of the piston cap 1408 is then engaged with the upper threaded portion 1420 of the piston body 1404 until the flange 1440 abuts the end of the piston body 1404 and captures the first bushing 1178 and the first cup seal 1182. A rod spring 1350 may or may not be captured between the piston cap 1408 and the ball 1232 to bias the piston rod 1130 into the socket 1424.

Operation of the right bicycle control device 1050 will be discussed below with reference to FIGS. 15-21. FIG. 15 shows the brake lever 1074 in a first or rest position. In the rest position, fluid communication is provided between the hydraulic fluid reservoir 1246, the reservoir aperture 1250, the compensation ports 1166, and a first chamber 1456 formed above the piston cap 1440. Fluid communication is also provided between the hydraulic fluid reservoir 1246, the reservoir aperture 1250, the timing ports 1170, and a second chamber 1460 formed between the first cup seal 1182 and the second cup seal 1266. In the rest position, no hydraulic fluid pressure is delivered to the rear brake 34 such that no braking occurs. The return spring 1210 biases the piston assembly 1400 toward the rest position.

Figure 16:
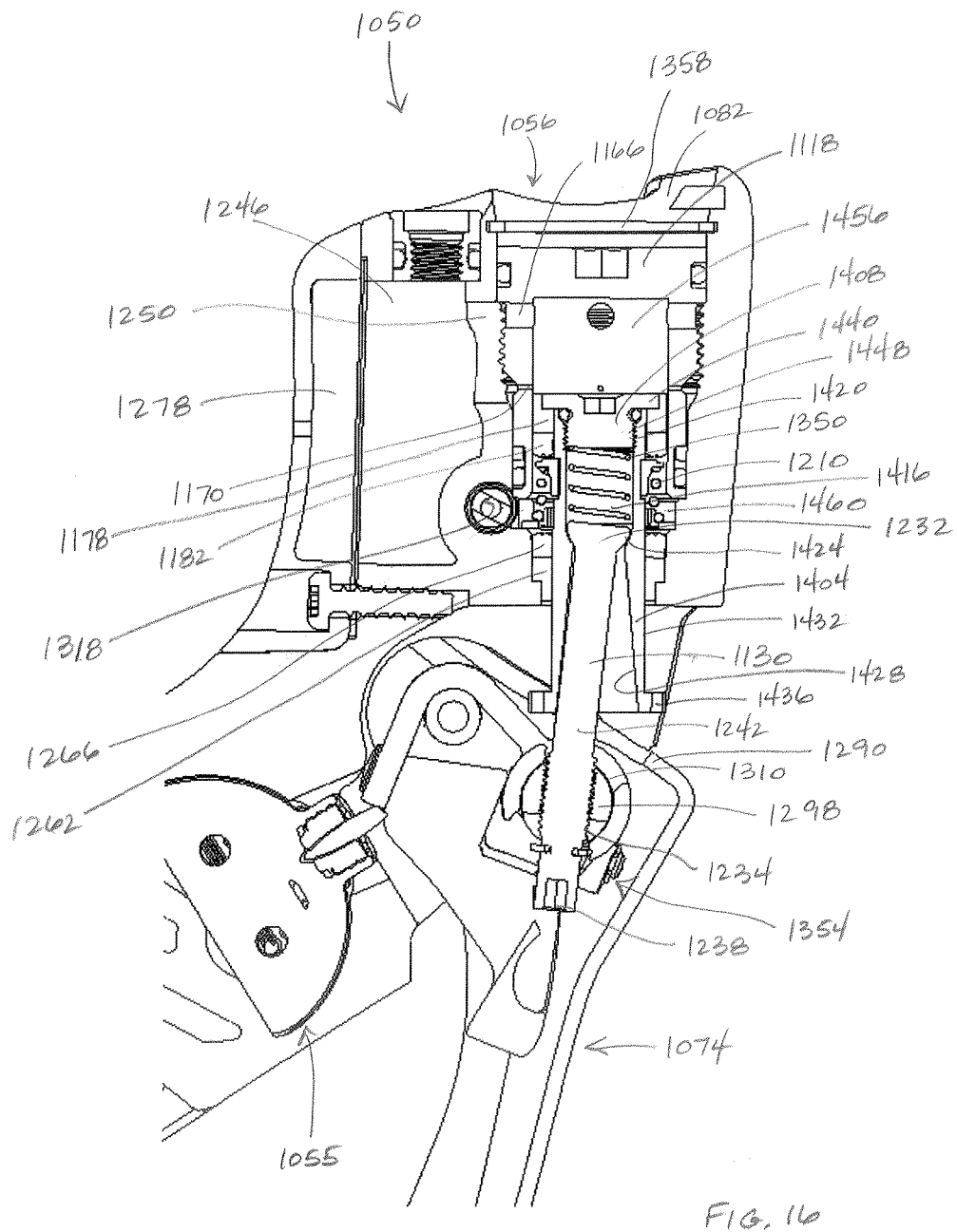
FIG. 16 is a sectional view of the bicycle control device of FIG. 15 positioned in an actuated position.

FIG. 16 shows the right bicycle control device 1050 in a second or actuated position. Here the user has pulled on the brake lever 1074. The captured ball 1298 pulls the piston rod 1130 downward (as shown in FIG. 16) and the piston assembly 1400 is drawn downward relative to the master cylinder sleeve 1118. Initially, as the brake lever 1074 is pulled, fluid communication through the timing ports 1170 allows hydraulic fluid to escape the second chamber 1460 back into the reservoir 1246 such that pressure is not initially provided to the rear brake 34. As the brake lever 1074 is further actuated by the user, the first cup seal 1182 passes over the timing ports 1170 and isolates the second chamber 1460 from the reservoir 1246. With the second chamber isolated, any further actuation of the brake lever 1074 by the user applies pressure to the rear brake 34 by forcing fluid out of the second chamber, through the outlet passageway 1318, and to the hydraulic brake lines.

When the user releases the brake lever 1074, the pressure from the hydraulic fluid and the bias provided by the return spring 1210 return the brake lever 1074 and the brake control device 1056 to the rest position.

Deadband adjustment and reach adjustment will be described below with respect to FIGS. 17-20. However, all of the presently described embodiments provide for independent deadband adjustment and reach adjustment. In other words, the adjustment of the deadband does not affect the reach adjustment (how far the user much reach to grasp the brake lever 1074) and vice versa.

Figure 17:
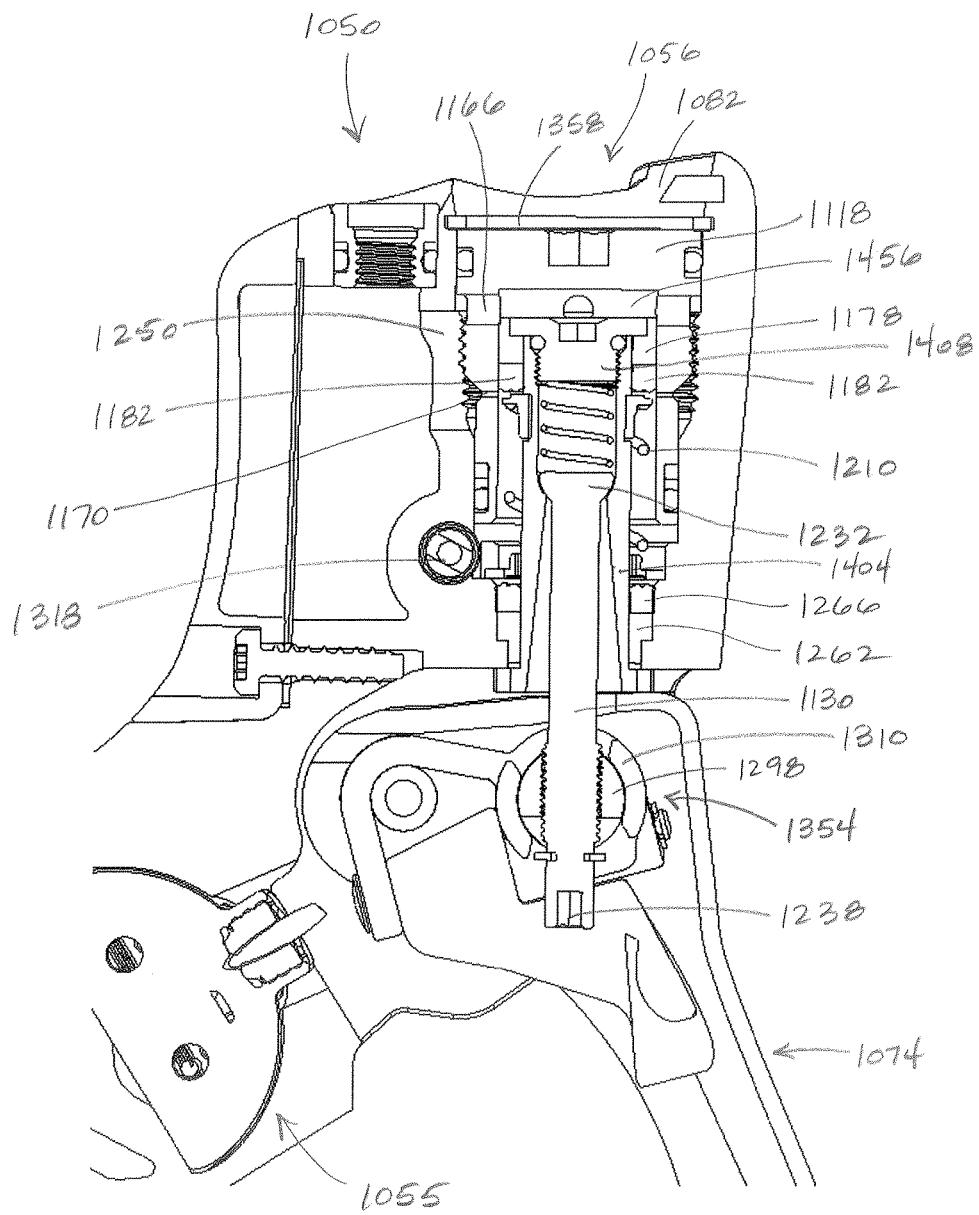
FIG. 17 is a sectional view of the bicycle control device of FIG. 15 arranged for maximum reach and minimum deadband.

FIG. 17 shows the right bicycle control device 1050 in a first arrangement with minimum deadband and maximum reach. In the first arrangement, the master cylinder sleeve 1118 is threaded as far out of the master cylinder aperture 1082 as the snap ring 1358 will allow to a first deadband position. In turn, while in the resting position, the piston assembly is positioned such that the first cup seal 1182 is arranged relatively close to the timing ports 1170 such that very shortly after pulling on the brake lever 1074, the user will begin applying pressure to the rear brake 34. This may also be described as a minimum deadband position.

Figure 18:
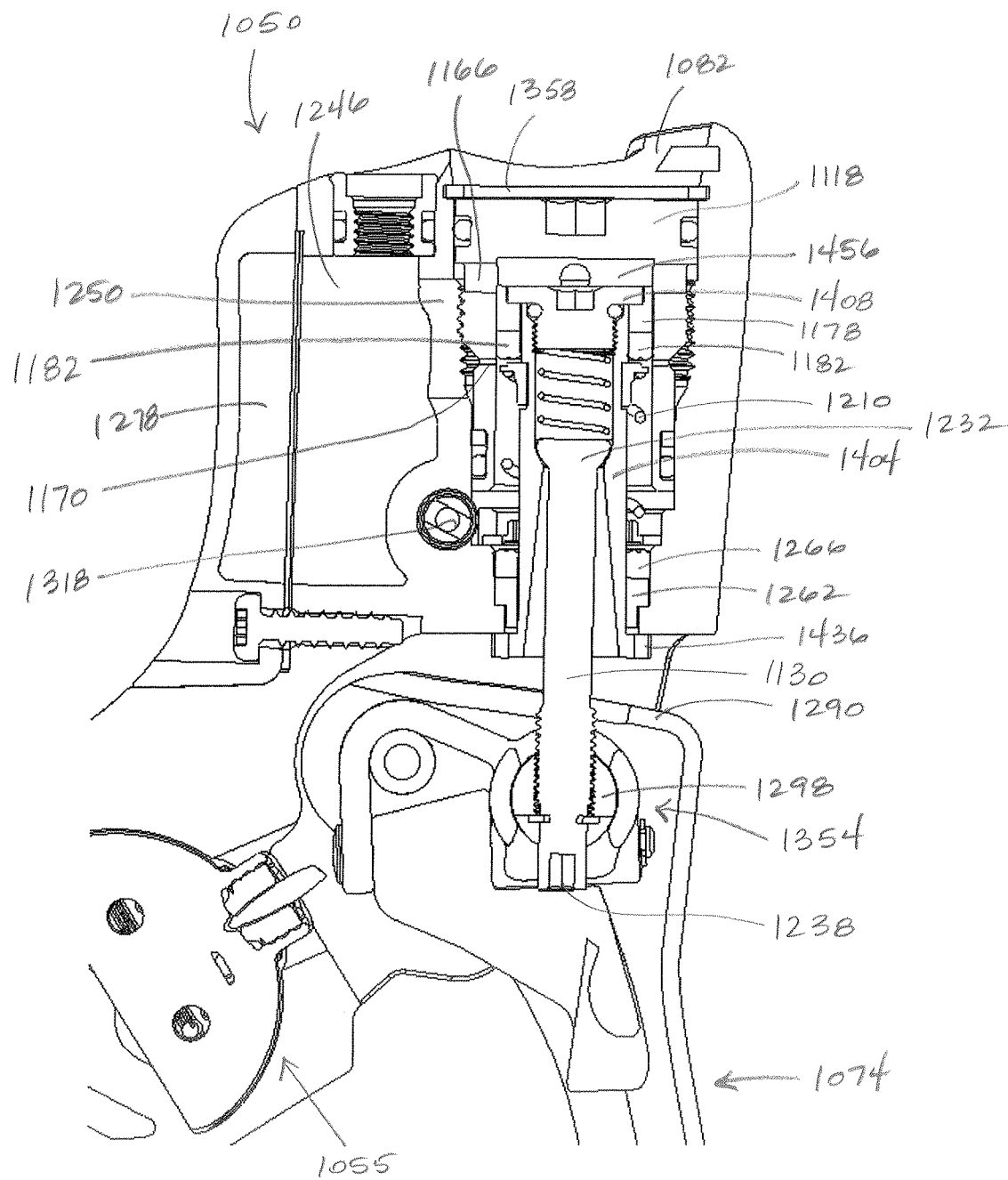
FIG. 18 is a sectional view of the bicycle control device of FIG. 15 arranged for minimum reach and minimum deadband.

FIG. 18 shows the right bicycle control device 1050 in a second arrangement with minimum deadband as described above, but also with minimum reach. Depending on the user's hand size and personal preference, a farther or a shorter reach may be desirable. By threading the piston rod 1130 farther into the captured ball 1298 of the reach adjustment mechanism 1354, the relative position of the brake lever 1074 is adjusted. In the illustrated embodiments, the hex key recess 1238 is used to adjust the reach. In other embodiments, the adjustment could be toolless. Adjusting the reach does not affect the deadband adjustment described above. As shown in FIG. 16, the first cup seal 1182 is still in the same position as shown in FIG. 15 relative to the timing ports 1170. This allows quick and straight forward adjustment of the deadband and the reach without the need to iteratively adjust both settings to arrive at a final comfortable arrangement.

Figure 19:
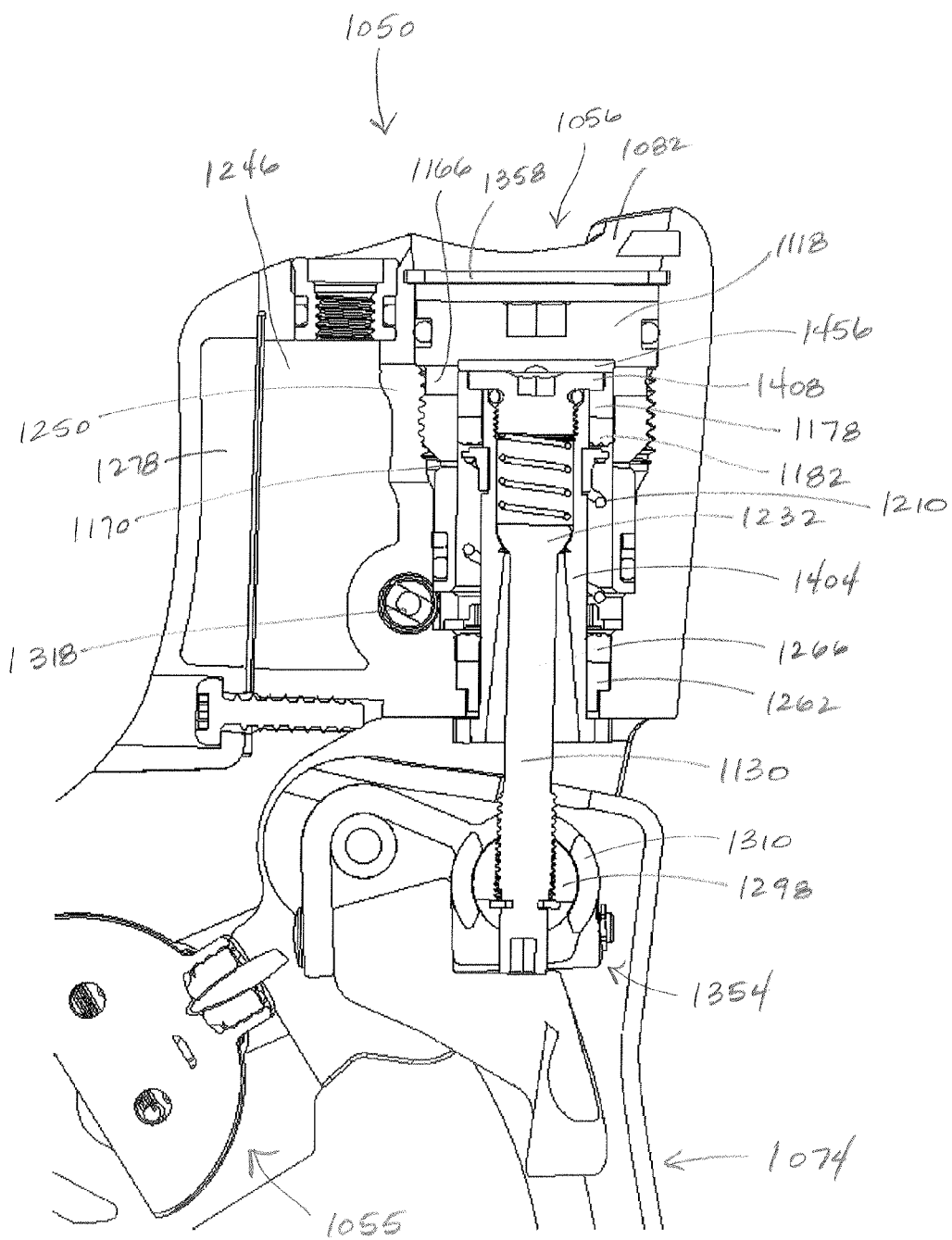
FIG. 19 is a sectional view of the bicycle control device of FIG. 15 arranged for minimum reach and maximum deadband.

FIG. 19 shows the right bicycle control device 1050 in a third arrangement with maximum deadband and minimum reach. Here the reach remains as described in FIG. 18, at the minimum reach arrangement (e.g., for someone with small hands), but the master cylinder sleeve 1118 is threaded farther into the master cylinder aperture 1082 to a second deadband position such that the distance between the first cup seal 1182 and the timing ports 1170 is relatively larger. In other words, the position of the master cylinder sleeve 1118 is adjusted relative to the piston assembly 1400. In the illustrated embodiments, the hex key recess 1134 is used to adjust the contact. In other embodiments, the adjustment could be toolless. In the third arrangement, the user will be able to pull on the brake lever 1074 for a relatively longer time before pressure is applied to the rear brake 34. The first chamber 1456 remains such that the master cylinder sleeve 1118 is not contacting the piston assembly 1400 and thereby allowing the reach adjustment to be arranged at a maximum position. Again, this allows the user to adjust the reach and/or the deadband fully between maximum and minimum arrangements without affecting the other setting.

Figure 20:
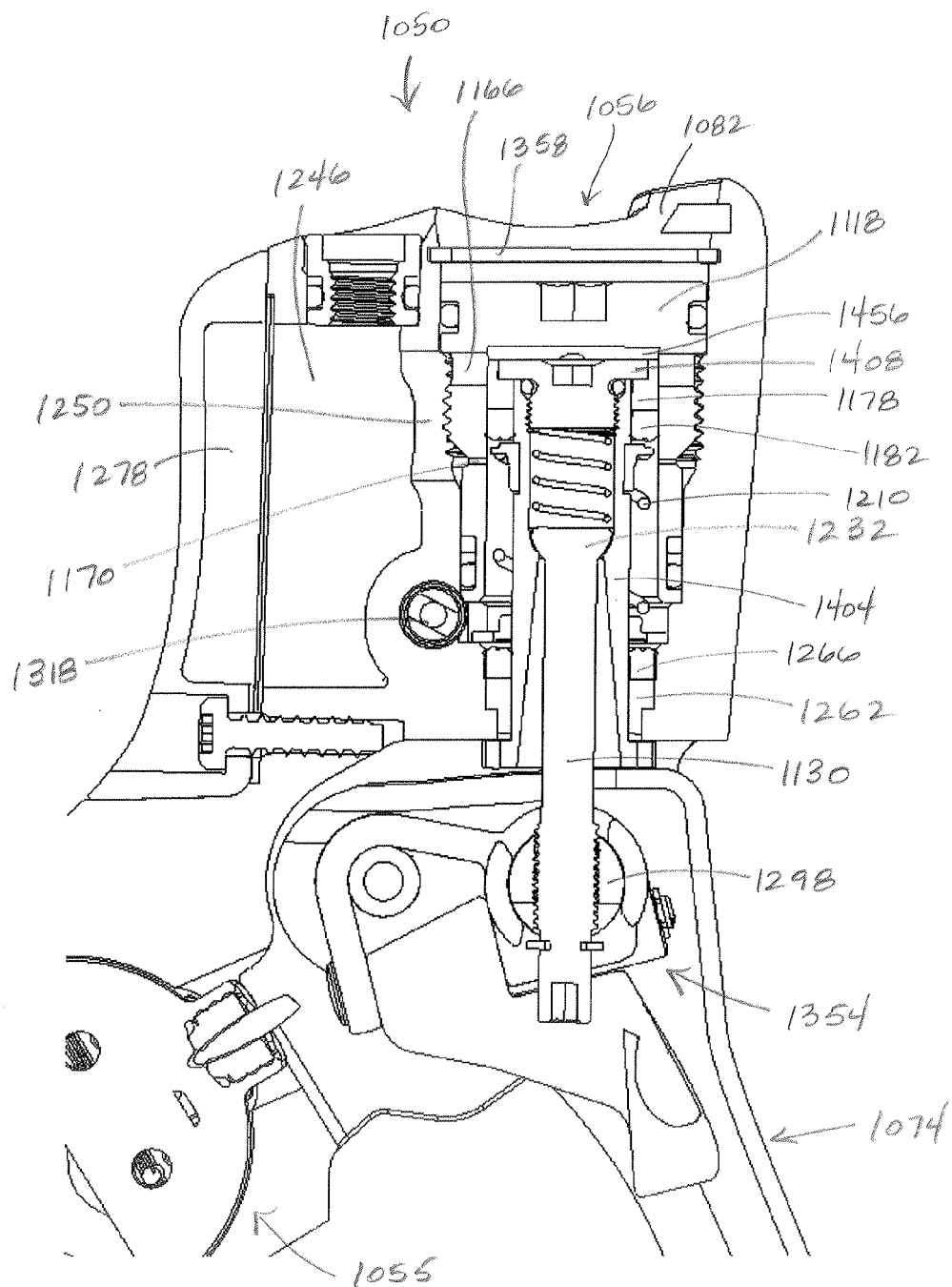
FIG. 20 is a sectional view of the bicycle control device of FIG. 15 arranged for maximum reach and maximum deadband.
Figure 21:
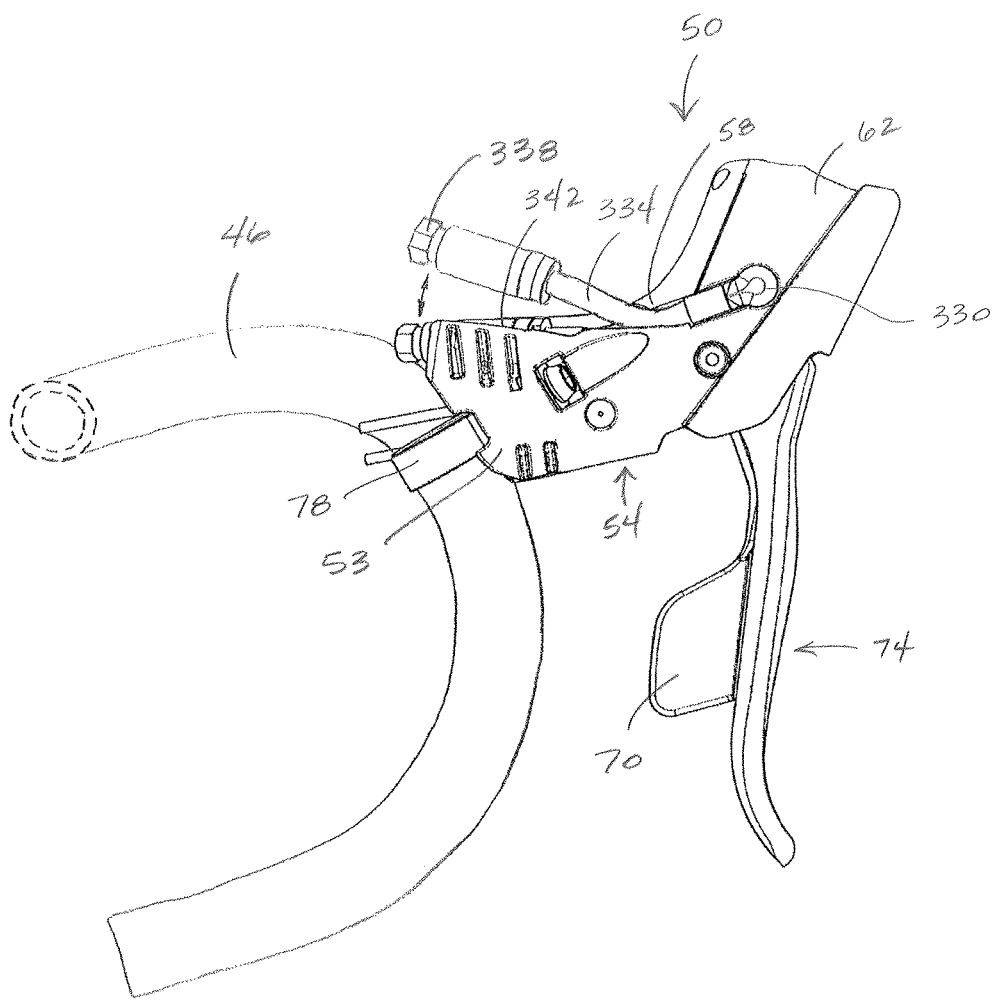
FIG. 21 is a side perspective view of the bicycle control device of FIG. 3.

FIG. 20 shows the right bicycle control device 1050 in a fourth arrangement with maximum reach and maximum deadband. In the fourth position, the piston rod 1130 is threaded out of the captured ball 1298 to provide a comfortable arrangement for someone with larger hands (for example).

While the above embodiments disclosed the brake control devices 56 and 1056 positioned in the horn portion 62, they may be adapted to be positioned in the gripping portion 58.

One advantage offered by the present disclosure is provided by the utilization of cup seals in place of O-rings for the first cup seal 182, 1182 and the second cup seal 266, 1266. It was surprisingly found that the use of cup seals provided decreased drag and lever force when compared to O-rings.

Another advantage offered by the present disclosure is provided by the position of the ball 232, 1232 and the socket 222, 1424 relative to the position of the second bushing 1262. As shown clearly in FIG. 16, when the brake lever 1073 is in the fully actuated position, the ball 1232 is still arranged above the second bushing 1262. In other words, the ball 1232 may always be arranged between the first bushing 1178 and the second bushing 1262. This arrangement allows the piston assembly 1400 to be balanced through the full range of motion of the brake lever 1074. In other words, in a balanced situation, the load is distributed to both the first bushing 1178 and the second bushing 1262 at all times. An unbalanced situation arises in brake systems where the ball or similar piston engaging portion extends past or partially past the bushing, thereby allowing an increased side load on the bushing and piston. Increased side load can lead to accelerated wear, leakage and other problems.

The present disclosure offers another advantage in the ability to adjust the deadband arrangement of the bicycle control device 50, 1050 without affecting the reach arrangement. Likewise, adjusting the reach arrangement does not affect the deadband arrangement. This allows the user to have a more accurate lever position (reach) and feeling (deadband) during setup and use.

Still another advantage is provided by arranging the brake control device 56, 1056 as a pull piston type system. Pull based systems may provide more consistent performance for all riding positions and usage situations. Additionally, by using a pull-type piston, the timing ports 170, 1170 are located relatively lower in the master cylinder (e.g., master cylinder sleeve 118, 1118). This allows for a more compact design while allowing for additional reservoir 246, 1246 volume to be above the timing ports 170, 1170. In turn, this results in a larger air trap feature. In other words, the lower timing ports 170, 1170 allow the system to better inhibit air bubbles from entering the hydraulic system.

Yet another advantage of the present embodiments is the ability of the brake lever 74, 1074 to extend forward in, for example, a crash situation without damaging the internal components of the brake control device 56, 1056. The ball 232, 1232 of the piston rod 130, 1130 is allowed to move upward past the rest position within the piston assembly in the event the brake lever 74, 1074 is forced forward. In other words, the brake lever 74, 1074 and the piston rod 130, 1130 are effectively decoupled from the piston assembly. The piston assembly is arranged such that the top wall 290, 1290 of the brake lever 74, 1074 will contact a stop element, in this embodiment the base portion 230, 1436 of the piston assembly, before the ball 232, 1232 contacts the piston cap 122, 1440 and can cause damage. The brake lever 74, 1074 can be designed to break before the housing 54, 1054 breaks. In this way, the relatively cheap brake lever 74, 1074 acts as a sacrificial part to save the relatively more expensive housing 54, 1054 and brake control device 56, 1056.

Another advantage of the present disclosure is provided in the ability to easily drill multiple compensation ports 166, 1166 and timing ports 170, 1170 in the master cylinder sleeve. Providing multiple ports in a cast or injection molded housing poses significant challenges. Likewise, machining the ports in after casting/molding is also difficult. Increasing the number of timing ports 170, 1170 allows for the diameter of each timing port 170, 1170 to be significantly smaller while still providing adequate fluid flow. Smaller ports allow the top cup seal 182, 1182 to smoothly pass over the ports without snagging, thereby inhibiting seal wear.

Still another advantage to the present disclosure is the ability to easily connect the hydraulic fitting 338 to the user's hydraulic lines. Looking to FIG. 21, the flexible tube 334 allows the user to remove the hydraulic fitting from the hydraulic tube recess 342 in the housing 54 while still maintaining the connection with the banjo fitting 330. The user may then simply attach the hydraulic hose to the fitting 338 and snap the hydraulic fitting 338 and the flexible tube 334 back into the hydraulic tube recess 342. This makes hydraulic connection easier when the bicycle control device 50, 1050 is already installed on the handlebar 46.

Yet another advantage of the present disclosure is the interaction of the ball 232, 1232 and the socket 122, 1424, and the piston internal bore 226/shaped rod clearance interior 1428. The assembly allows the piston rod 130, 1130 to rotate within the socket 122, 1424 while minimizing side loading. While in the resting position, the piston rod 130, 1130 is substantially aligned with the brake piston axis B (see FIG. 13), but when the brake lever is in the actuated position, the piston rod 130, 1130 is arranged at a substantially oblique angle to the brake piston axis B.

Numerous modifications to the embodiments disclosed herein will be apparent to those skilled in the art in view of the foregoing description. For example, any of the embodiments disclosed herein may be modified to include any of the structures or/and methodologies disclosed in connection with different embodiments. Accordingly, this disclosure is to be construed as illustrative only and is presented for the purpose of enabling those skilled in the art to make and use the invention and to teach the best mode of carrying out same. The exclusive rights to all modifications which come within the scope of the appended claims are reserved.

What is claimed is:

1. A bicycle control device for use with a road bicycle, the bicycle control device comprising:
   a housing configured to be attached to a handlebar of the road bicycle;
   a hydraulic brake control device including:
      a master cylinder arranged in the housing,
      a piston assembly including a piston slidably disposed within the master cylinder, and
      a brake lever operatively coupled to the piston such that the brake lever pulls the piston from a rest position to an actuated position; and
   a shift control device disposed in the housing,
   wherein if the brake lever becomes over-extended the piston is effectively decoupled from the brake lever to inhibit damage to internal components of the hydraulic brake control device.

2. The bicycle control device of claim 1, wherein the piston assembly includes: a piston including a piston cap and a piston body coupled together; and a piston rod having a first end coupled to the piston body and a second end coupled to the brake lever, the first end of the piston rod spaced apart from the piston cap.

3. The bicycle control device of claim 2, wherein the brake lever is configured to contact a stop element before the first end of the piston rod contacts the piston cap.

4. The bicycle control device of claim 1, wherein the piston assembly includes a piston rod including a piston engaging portion, a shaft, and a threaded portion, the piston engaging portion coupled to the piston and the threaded portion threadingly coupled to the brake lever to adjust a rest position of the brake lever.

5. The bicycle control device of claim 4, wherein the piston engaging portion includes a ball rotatably coupled to the piston.

6. The bicycle control device of claim 4, wherein the piston is supported by first and second bushings as the piston moves between the rest position and the actuated position, and wherein the piston engaging portion of the piston rod is arranged between the first and second bushings and as the piston assembly moves between the rest position and the actuated position.

7. The bicycle control device of claim 1, wherein the piston assembly includes a first seal between the piston and the master cylinder.

8. The bicycle control device of claim 7, wherein the first seal is a cup seal.

9. The bicycle control device of claim 1, wherein the master cylinder includes a master cylinder sleeve disposed in the housing, the master cylinder sleeve including a master cylinder bore, the piston slidably disposed within the master cylinder bore.

10. The bicycle control device of claim 9, further comprising an adjuster operatively coupled with the master cylinder sleeve to adjust the master cylinder sleeve between a first deadband position and a second deadband position.

11. The bicycle control device of claim 10, wherein the piston assembly includes a first seal between the piston and the master cylinder sleeve, the master cylinder sleeve including at least one port providing fluid communication between a hydraulic fluid reservoir and the master cylinder bore, and when the master cylinder sleeve is in the first deadband position, the at least one port is closer to the first seal than when the master cylinder sleeve is in the second deadband position.

12. The bicycle control device of claim 11, wherein the adjuster includes threads on the master cylinder sleeve threadingly received in the housing, the master cylinder sleeve threadable between the first and second deadband positions.

13. The bicycle control device of claim 10, wherein a rest positon of the brake lever is not affected by the adjustment of the master cylinder sleeve.

14. The bicycle control device of claim 9, wherein the master cylinder sleeve includes at least one port providing fluid communication between a hydraulic fluid reservoir and the master cylinder bore.

15. The bicycle control device of claim 1, further comprising a fluid outlet passageway, wherein the piston assembly defines a brake piston axis, and wherein the fluid outlet passageway is arranged substantially perpendicular to the brake piston axis.

16. The bicycle control device of claim 1, further comprising a reach adjust mechanism operatively connected to the brake lever for adjusting a rest position of the brake lever relative to the handlebar independently of the position of the master cylinder.

17. The bicycle control device of claim 16, wherein the piston assembly includes a piston rod having a threaded portion, wherein the brake lever includes a bracket coupled to the reach adjustment mechanism that includes a reach adjustment ball having a threaded reach aperture, the threaded portion of the piston rod threaded into the threaded reach aperture of the reach adjustment ball.

18. The bicycle control device of claim 1, wherein the housing includes a horn portion including a hydraulic fluid reservoir.

19. The bicycle control device of claim 18, further comprising a reservoir cap coupled to the horn portion to cover the hydraulic fluid reservoir; and a diaphragm arranged between the hydraulic fluid reservoir and the reservoir cap.

20. A bicycle control device for use with a road bicycle, comprising:
a housing having a handlebar mounting portion at a first end of the housing, a horn portion at a second end of the housing, and a gripping portion disposed between the handlebar mounting portion and the horn portion;
a master cylinder arranged in the housing;
a piston assembly including a piston slidably disposed within the master cylinder;
an actuator operatively coupled to the piston to slidably displace the piston between a rest position and an actuated position; and
an adjuster operatively coupled to the master cylinder to adjust the master cylinder relative to the piston assembly,
wherein if the brake lever becomes over-extended the piston is effectively decoupled from the brake lever to inhibit damage to internal components of the bicycle control device.

21. The bicycle control device of claim 20, wherein the piston assembly includes: a piston including a piston cap and a piston body coupled together; and
a piston rod having a first end coupled to the piston body and a second end coupled to the actuator, the first end of the piston rod spaced apart from the piston cap.

22. The bicycle control device of claim 21, wherein the brake lever is configured to contact a stop element before the first end of the piston rod contacts the piston cap.

23. The bicycle control device of claim 20, wherein the piston assembly includes a piston rod including a piston engaging portion, a shaft, and a threaded portion, the piston engaging portion coupled to the piston and the threaded portion threadingly coupled to the actuator to adjust a rest position of the brake lever.

24. The bicycle control device of claim 23, wherein the piston engaging portion includes a ball rotatably coupled to the piston.

25. The bicycle control device of claim 23, wherein the piston is supported by first and second bushings as the piston moves between the rest position and the actuated position, and wherein the piston engaging portion of the piston rod is arranged between the first and second bushings as the piston moves between the rest position and the actuated position.

26. The bicycle control device of claim 20, wherein the piston assembly includes a first seal between the piston and the master cylinder.

27. The bicycle control device of claim 26, wherein the first seal is a cup seal.

28. The bicycle control device of claim 20, further comprising a shift control device positioned in the housing.

29. The bicycle control device of claim 20, further comprising a fluid outlet passageway received in the housing; and wherein the piston defines a brake piston axis, and wherein the fluid outlet passageway is arranged substantially perpendicular to the brake piston axis.

30. The bicycle control device of claim 20, wherein the actuator includes a brake lever coupled to the housing, wherein a rest position of the brake lever relative to the housing is adjustable independent of the position of the master cylinder.

31. The bicycle control device of claim 30, wherein the piston assembly includes a piston rod including a threaded portion, and wherein the brake lever includes a bracket coupled to a reach adjustment mechanism including a reach adjustment ball having a threaded reach aperture, the threaded portion of the piston rod threaded into the threaded reach aperture of the reach adjustment ball.

32. The bicycle control device of claim 20, wherein the actuator is arranged to pull the piston from the rest position toward the actuated position.

33. The bicycle control device of claim 20, wherein the horn portion of the housing includes a hydraulic fluid reservoir.

34. The bicycle control device of claim 33, further comprising a reservoir cap coupled to the horn portion to cover the hydraulic fluid reservoir; and a diaphragm arranged between the hydraulic fluid reservoir and the reservoir cap.

35. A bicycle control device for use with a road bicycle, comprising:
a housing having a handlebar mounting portion at a first end of the housing, a horn portion at a second end of the housing, and a gripping portion disposed between the handlebar mounting portion and the horn portion;
a master cylinder arranged in the housing;
a piston assembly including a piston slidably disposed within the master cylinder;
an actuator operatively coupled to the piston to slidably displace the piston between a rest position and an actuated position; and
an adjuster operatively coupled to the master cylinder to adjust the master cylinder relative to the piston assembly, wherein the master cylinder includes a master cylinder sleeve disposed within the housing, the adjuster operatively coupled to the master cylinder sleeve to adjust the master cylinder sleeve relative to the piston assembly, the master cylinder sleeve including a master cylinder bore, the piston slidably disposed within the master cylinder bore,
wherein the adjuster adjusts the master cylinder sleeve between the first deadband position and the second deadband position,
wherein the actuator includes a brake lever coupled to the housing, wherein the piston assembly includes a first seal between the piston and the master cylinder sleeve, wherein the master cylinder sleeve includes at least one port providing fluid communication between a hydraulic fluid reservoir and the master cylinder bore, and wherein when the master cylinder sleeve is in the first deadband position, the at least one port is closer to the first seal than when the master cylinder sleeve is in the second deadband position, and
wherein the adjuster includes threads on the master cylinder sleeve threadingly received in the housing, the master cylinder sleeve threadable between first and second deadband positions.

36. The bicycle control device of claim 27, wherein a rest position of the brake lever is not affected by the adjustment of the master cylinder sleeve.

37. The bicycle control device of claim 27, wherein the master cylinder sleeve includes at least one port providing fluid communication between a hydraulic fluid reservoir and the master cylinder bore.

38. A bicycle control device for use with a road bicycle, the bicycle control device comprising:
a housing having a handlebar mounting portion at a first end of the housing, a horn portion at a second end of the housing, and a gripping portion disposed between the handlebar mounting portion and the horn portion, the housing including a master cylinder aperture and a hydraulic fluid reservoir;
a master cylinder sleeve disposed in the master cylinder aperture, the master cylinder sleeve defining a master cylinder bore;
a piston assembly including a piston slidably disposed within the master cylinder bore;
an actuator operatively coupled to the piston to slidably displace the piston between a rest position and an actuated position, and
an adjuster operatively coupled to the master cylinder sleeve to adjust the master cylinder sleeve between a first deadband position and a second deadband position,
wherein the actuator includes a brake lever coupled to the housing, wherein the master cylinder sleeve includes a least one port providing fluid communication between the hydraulic fluid reservoir and the master cylinder bore, wherein the piston assembly includes a first seal between the piston and the master cylinder bore, and wherein when the master cylinder sleeve is in the first deadband position, the at least one port is closer to the first seal than when the master cylinder sleeve is in the second deadband position,
wherein the adjuster includes threads on the master cylinder sleeve threadingly received in the master cylinder aperture of the housing, the master cylinder sleeve threadable between the first and second deadband positions.

39. The bicycle control device of claim 38, wherein the rest position of the actuator is not affected by the adjustment of the master cylinder sleeve.

40. The bicycle control device of claim 38, wherein the adjuster includes threads on the master cylinder sleeve threadingly received in the master cylinder aperture of the housing, the master cylinder sleeve threadable between the first and second deadband positions.

41. The bicycle control device of claim 38, wherein the actuator includes a brake lever coupled to the housing, and wherein if the brake lever becomes over-extended, the piston assembly is effectively decoupled from the brake lever to inhibit damage to internal components of the bicycle control device.

42. The bicycle control device of claim 41, wherein the piston assembly includes: a piston including a piston cap and a piston body coupled together; and a piston rod having a first end coupled to the piston body and a second end coupled to the brake lever, the first end of the piston rod spaced apart from the piston cap.

43. The bicycle control device of claim 42, wherein the brake lever is configured to contact a stop element before the first end of the piston rod contacts the piston cap.

44. The bicycle control device of claim 38, wherein the piston assembly includes a piston rod including a piston engaging portion, a shaft, and a threaded portion, the piston engaging portion coupled to the piston and the threaded portion threadingly coupled to the actuator to adjust a rest position of the actuator.

45. The bicycle control device of claim 44, wherein the piston engaging portion includes a ball rotatably coupled to the piston.

46. The bicycle control device of claim 44, wherein the piston is supported by first and second bushings as the piston displaces between the rest position and the actuated position, and wherein the piston engaging portion of the piston rod is arranged between the first and second bushings as the piston displaces between the rest position and the actuated position.

47. The bicycle control device of claim 38, wherein the piston assembly includes a first seal between the piston assembly and the master cylinder bore.

48. The bicycle control device of claim 47, wherein the first seal is a cup seal.

49. The bicycle control device of claim 38, further comprising a shift control device positioned in the housing.

50. The bicycle control device of claim 38, wherein the master cylinder sleeve includes at least one port providing fluid communication between the hydraulic fluid reservoir and the master cylinder bore.

51. The bicycle control device of claim 38, further comprising a fluid outlet passageway, wherein the piston assembly defines a piston axis, and wherein the fluid outlet passageway is arranged substantially perpendicular to the piston axis.

52. The bicycle control device of claim 38, wherein the rest position of the actuator relative to the housing is adjustable independent of the position of the master cylinder sleeve.

53. The bicycle control device of claim 52, wherein the piston assembly includes a piston rod defining a threaded portion, and wherein the actuator includes a brake lever including a bracket coupled to a reach adjustment mechanism including a reach adjustment ball having a threaded reach aperture, the threaded portion of the piston rod threaded into the threaded reach aperture of the reach adjustment ball.

54. The bicycle control device of claim 38, wherein the hydraulic fluid reservoir is disposed in the horn portion of the housing.

55. The bicycle control device of claim 54, further comprising a reservoir cap coupled to the horn portion to cover the hydraulic fluid reservoir; and a diaphragm arranged between the hydraulic fluid reservoir and the reservoir cap.

\* \* \* \* \*